(12) United States Patent
Goodman et al.

(10) Patent No.: US 7,665,131 B2
(45) Date of Patent: Feb. 16, 2010

(54) ORIGINATION/DESTINATION FEATURES AND LISTS FOR SPAM PREVENTION

(75) Inventors: Joshua T. Goodman, Redmond, WA (US); Robert L. Rounthwaite, Fall City, WA (US); Daniel Gwozdz, Sammamish, WA (US); John D. Mehr, Seattle, WA (US); Nathan D. Howell, Seattle, WA (US); Micah C. Rupersburg, Seattle, WA (US); Bryan T. Starbuck, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 11/621,363

(22) Filed: Jan. 9, 2007

(65) Prior Publication Data
US 2007/0118904 A1    May 24, 2007

Related U.S. Application Data

(63) Continuation of application No. 10/454,168, filed on Jun. 4, 2003, now Pat. No. 7,272,853.

(51) Int. Cl.
*H04L 29/06* (2006.01)
(52) U.S. Cl. .......................... 726/13; 726/22
(58) Field of Classification Search ............. 726/13
See application file for complete search history.

(56) References Cited

U.S. PATENT DOCUMENTS

| | | |
|---|---|---|
| 5,377,354 A | 12/1994 | Scannell et al. |
| 5,619,648 A | 4/1997 | Canale et al. |
| 5,638,487 A | 6/1997 | Chigier |
| 5,704,017 A | 12/1997 | Heckerman et al. |
| 5,805,801 A | 9/1998 | Holloway et al. |
| 5,835,087 A | 11/1998 | Herz et al. |

(Continued)

FOREIGN PATENT DOCUMENTS

EP    413537    2/1991

(Continued)

OTHER PUBLICATIONS

OA dated Oct. 8, 2008 for U.S. Appl. No. 11/743,466, 43 pages.

(Continued)

*Primary Examiner*—Matthew B Smithers
(74) *Attorney, Agent, or Firm*—Lee & Hayes, PLLC

(57) ABSTRACT

The present invention involves a system and method that facilitate extracting data from messages for spam filtering. The extracted data can be in the form of features, which can be employed in connection with machine learning systems to build improved filters. Data associated with origination information as well as other information embedded in the body of the message that allows a recipient of the message to contact and/or respond to the sender of the message can be extracted as features. The features, or a subset thereof, can be normalized and/or deobfuscated prior to being employed as features of the machine learning systems. The (deobfuscated) features can be employed to populate a plurality of feature lists that facilitate spam detection and prevention. Exemplary features include an email address, an IP address, a URL, an embedded image pointing to a URL, and/or portions thereof.

20 Claims, 13 Drawing Sheets

U.S. PATENT DOCUMENTS

| | | | |
|---|---|---|---|
| 5,884,033 | A | 3/1999 | Duvall et al. |
| 5,905,859 | A | 5/1999 | Holloway et al. |
| 6,003,027 | A | 12/1999 | Prager |
| 6,023,723 | A | 2/2000 | McCormick et al. |
| 6,041,324 | A | 3/2000 | Earl et al. |
| 6,047,242 | A | 4/2000 | Benson |
| 6,052,709 | A * | 4/2000 | Paul ........................ 709/202 |
| 6,072,942 | A | 6/2000 | Stockwell et al. |
| 6,101,531 | A | 8/2000 | Eggleston et al. |
| 6,112,227 | A | 8/2000 | Heiner |
| 6,122,657 | A | 9/2000 | Hoffman, Jr. et al. |
| 6,161,130 | A | 12/2000 | Horvitz et al. |
| 6,167,434 | A | 12/2000 | Pang |
| 6,192,360 | B1 | 2/2001 | Dumais et al. |
| 6,199,102 | B1 | 3/2001 | Cobb |
| 6,266,692 | B1 | 7/2001 | Greenstein |
| 6,308,273 | B1 | 10/2001 | Goertzel et al. |
| 6,314,421 | B1 | 11/2001 | Sharnoff et al. |
| 6,321,267 | B1 | 11/2001 | Donaldson |
| 6,327,617 | B1 | 12/2001 | Fawcett |
| 6,330,590 | B1 | 12/2001 | Cotten |
| 6,351,740 | B1 | 2/2002 | Rabinowitz |
| 6,370,526 | B1 | 4/2002 | Agrawal et al. |
| 6,393,465 | B2 | 5/2002 | Leeds |
| 6,421,709 | B1 | 7/2002 | McCormick et al. |
| 6,424,997 | B1 | 7/2002 | Buskirk, Jr. et al. |
| 6,434,600 | B2 | 8/2002 | Waite et al. |
| 6,453,327 | B1 | 9/2002 | Nielsen |
| 6,477,551 | B1 | 11/2002 | Johnson et al. |
| 6,484,197 | B1 | 11/2002 | Donohue |
| 6,484,261 | B1 | 11/2002 | Wiegel |
| 6,505,250 | B2 | 1/2003 | Freund et al. |
| 6,546,416 | B1 | 4/2003 | Kirsch |
| 6,592,627 | B1 | 7/2003 | Agrawal et al. |
| 6,615,242 | B1 | 9/2003 | Riemers |
| 6,633,855 | B1 | 10/2003 | Auvenshine |
| 6,643,686 | B1 | 11/2003 | Hall |
| 6,684,201 | B1 | 1/2004 | Brill |
| 6,691,156 | B1 | 2/2004 | Drummond et al. |
| 6,701,350 | B1 | 3/2004 | Mitchell |
| 6,701,440 | B1 | 3/2004 | Kim et al. |
| 6,728,690 | B1 | 4/2004 | Meek et al. |
| 6,732,149 | B1 | 5/2004 | Kephart |
| 6,732,157 | B1 | 5/2004 | Gordon et al. |
| 6,732,273 | B1 | 5/2004 | Byers |
| 6,742,047 | B1 | 5/2004 | Tso |
| 6,748,422 | B2 | 6/2004 | Morin et al. |
| 6,751,348 | B2 | 6/2004 | Buzuloiu et al. |
| 6,757,830 | B1 | 6/2004 | Tarbotton et al. |
| 6,768,991 | B2 | 7/2004 | Hearnden |
| 6,775,704 | B1 | 8/2004 | Watson et al. |
| 6,779,021 | B1 | 8/2004 | Bates et al. |
| 6,785,820 | B1 | 8/2004 | Muttik |
| 6,842,773 | B1 | 1/2005 | Ralston et al. |
| 6,853,749 | B2 | 2/2005 | Watanabe et al. |
| 6,915,334 | B1 | 7/2005 | Hall |
| 6,920,477 | B2 | 7/2005 | Mitzenmacher |
| 6,928,465 | B2 | 8/2005 | Earnest |
| 6,971,023 | B1 | 11/2005 | Makinson et al. |
| 7,003,555 | B1 | 2/2006 | Jungck |
| 7,032,030 | B1 | 4/2006 | Codignotto |
| 7,051,077 | B2 | 5/2006 | Lin |
| 7,117,358 | B2 | 10/2006 | Bandini et al. |
| 7,146,402 | B2 | 12/2006 | Kucherawy |
| 7,155,243 | B2 | 12/2006 | Baldwin et al. |
| 7,155,484 | B2 | 12/2006 | Malik |
| 7,188,369 | B2 | 3/2007 | Ho et al. |
| 7,219,148 | B2 | 5/2007 | Rounthwaite et al. |
| 7,249,162 | B2 | 7/2007 | Rounthwaite et al. |
| 7,263,607 | B2 | 8/2007 | Ingerman et al. |
| 7,293,063 | B1 | 11/2007 | Sobel |
| 7,320,020 | B2 | 1/2008 | Chadwick et al. |
| 7,359,941 | B2 | 4/2008 | Doan et al. |
| 7,366,761 | B2 | 4/2008 | Murray et al. |
| 2001/0034849 | A1 | 10/2001 | Powers |
| 2001/0046307 | A1 | 11/2001 | Wong |
| 2002/0016956 | A1 | 2/2002 | Fawcett |
| 2002/0059425 | A1 | 5/2002 | Belfiore et al. |
| 2002/0073157 | A1 | 6/2002 | Newman et al. |
| 2002/0091738 | A1 | 7/2002 | Rohrabaugh et al. |
| 2002/0124025 | A1 | 9/2002 | Janakiraman et al. |
| 2002/0129111 | A1 | 9/2002 | Cooper |
| 2002/0147782 | A1 | 10/2002 | Dimitrova et al. |
| 2002/0174185 | A1 | 11/2002 | Rawat et al. |
| 2002/0184315 | A1 | 12/2002 | Earnest |
| 2002/0199095 | A1 | 12/2002 | Bandini et al. |
| 2003/0009495 | A1 | 1/2003 | Adjaoute |
| 2003/0009698 | A1 | 1/2003 | Lindeman et al. |
| 2003/0016872 | A1 | 1/2003 | Sun |
| 2003/0037074 | A1 | 2/2003 | Dwork et al. |
| 2003/0041126 | A1 | 2/2003 | Buford et al. |
| 2003/0088627 | A1 * | 5/2003 | Rothwell et al. ............ 709/206 |
| 2003/0149733 | A1 | 8/2003 | Capiel |
| 2003/0167311 | A1 | 9/2003 | Kirsch |
| 2003/0191969 | A1 | 10/2003 | Katsikas |
| 2003/0204569 | A1 | 10/2003 | Andrews et al. |
| 2003/0320054 | | 10/2003 | Cheng et al. |
| 2003/0229672 | A1 | 12/2003 | Kohn |
| 2004/0003283 | A1 | 1/2004 | Goodman et al. |
| 2004/0015554 | A1 | 1/2004 | Wilson |
| 2004/0019650 | A1 | 1/2004 | Auvenshine |
| 2004/0054887 | A1 | 3/2004 | Paulsen et al. |
| 2004/0073617 | A1 | 4/2004 | Milliken et al. |
| 2004/0083270 | A1 * | 4/2004 | Heckerman et al. ......... 709/207 |
| 2004/0093371 | A1 | 5/2004 | Burrows et al. |
| 2004/0139160 | A1 | 7/2004 | Wallace et al. |
| 2004/0139165 | A1 | 7/2004 | McMillan et al. |
| 2004/0148330 | A1 | 7/2004 | Alspector et al. |
| 2004/0177120 | A1 * | 9/2004 | Kirsch ....................... 709/206 |
| 2004/0199594 | A1 | 10/2004 | Radatti et al. |
| 2004/0210640 | A1 * | 10/2004 | Chadwick et al. ........... 709/207 |
| 2004/0215977 | A1 | 10/2004 | Goodman et al. |
| 2004/0255122 | A1 | 12/2004 | Ingerman et al. |
| 2004/0260776 | A1 | 12/2004 | Starbuck et al. |
| 2005/0015455 | A1 | 1/2005 | Liu |
| 2005/0050150 | A1 | 3/2005 | Dinkin |
| 2005/0060643 | A1 | 3/2005 | Glass et al. |
| 2005/0076084 | A1 | 4/2005 | Loughmiller et al. |
| 2005/0080855 | A1 | 4/2005 | Murray |
| 2005/0080889 | A1 | 4/2005 | Malik et al. |
| 2005/0081059 | A1 | 4/2005 | Bandini et al. |
| 2005/0091321 | A1 | 4/2005 | Daniell et al. |
| 2005/0097174 | A1 | 5/2005 | Daniell |
| 2005/0102366 | A1 | 5/2005 | Kirsch |
| 2005/0114452 | A1 | 5/2005 | Prakash |
| 2005/0120019 | A1 | 6/2005 | Rigoutsos et al. |
| 2005/0159136 | A1 | 7/2005 | Rouse et al. |
| 2005/0160148 | A1 | 7/2005 | Yu |
| 2005/0165895 | A1 | 7/2005 | Rajan et al. |
| 2005/0182735 | A1 | 8/2005 | Zager et al. |
| 2005/0188023 | A1 | 8/2005 | Doan et al. |
| 2005/0204159 | A1 | 9/2005 | Davis et al. |
| 2005/0228899 | A1 | 10/2005 | Wendkos et al. |
| 2006/0031303 | A1 | 2/2006 | Pang |
| 2006/0031306 | A1 | 2/2006 | Haverkos |
| 2006/0036701 | A1 | 2/2006 | Bulfer et al. |
| 2006/0123083 | A1 | 6/2006 | Goutte et al. |
| 2006/0265498 | A1 | 11/2006 | Turgeman et al. |
| 2007/0101423 | A1 | 5/2007 | Oliver et al. |
| 2007/0130350 | A1 | 6/2007 | Alperovitch et al. |
| 2007/0130351 | A1 | 6/2007 | Alperovitch et al. |
| 2007/0133034 | A1 | 6/2007 | Jindal et al. |

| | | |
|---|---|---|
| 2008/0104186 A1 | 5/2008 | Wieneke et al. |

FOREIGN PATENT DOCUMENTS

| | | |
|---|---|---|
| EP | 720333 | 7/1996 |
| EP | 1376427 | 3/2003 |
| EP | 1376427 A2 | 1/2004 |
| EP | 1376427 A3 | 1/2004 |
| KR | 20020030704 A | 4/2002 |
| RU | 2127959 C1 | 3/1999 |
| WO | 9635994 | 11/1996 |
| WO | 9967731 | 12/1999 |
| WO | WO9967731 A1 | 12/1999 |
| WO | 02071286 | 9/2002 |
| WO | 03/054764 | 7/2003 |
| WO | 2004059506 | 7/2004 |

OTHER PUBLICATIONS

OA dated Nov. 28, 2008 for U.S. Appl. No. 10/799,455, 53 pages.
OA dated Nov. 6, 2008 for U.S. Appl. No. 10/799,992, 46 pages.
OA dated Jan. 16, 2009 for U.S. Appl. No. 10/917,077, 34 pages.
"MIME", The Microsoft Computer Dictionary. 5th ed. Redmond, WA; Microsoft Press. May 1, 2002.
Ron White, How Computers Work, 2004, QUE Publishing, pp. 238-239.
Michael S. Mimoso, "Quick Takes: Image Analysis, Filtering Comes to E-mail Security", http://searchsecurity.techtarget.com/originalContent.html (Feb. 5, 2002).
"Clearswift Announces the Most Complete e-Policy-Based Email Content Security Product for Service Providers", http://www.clearswift.com/news/item.aspx?ID=144. (Oct. 12, 2002).
Fabrizio Sebastiani. Machine Learning in Automated Text Categorization. ACM Computing Surveys, vol. 34 Issue 1, pp. 1-47, 2002.
I. Androutsopoulos, G. Paliouras, V. Karkaletsis, G. Sakkis, C.D. Spyropoulos, and P. Stamatopoulos. Learning to Filter Spam E-mail: A Comparison of a Naive Bayesian and a Memory-based Approach. 4th PKDD's Workshop on Machine Learning and Textual Information Access, 2000. 13 pages.
Thorsten Joachims. Transductive Inference for Text Classification using Support Vector Machines. Proceedings of the 16th International Conference on Machine Learning, 1999. 10 pages.
European Search Report, EP31087TE900, mailed Nov. 11, 2004.
J. Byrne, My Spamblock, Google, Jan. 19, 1997, 2 pages.
D. F. Skoll, How to Make Sure a Human is Sending You Mail, Google, Nov. 17, 1996, 2 pages.
L. M. Bowman, Hotmail Spam Filters Block Outgoing E-Mail, CNET NEWS.COM, Jan. 18, 2001, 3 pages.
Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003, pp. 147-154, Orlando, FL, USA.
Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA, USA.
Graham, P., The Future of Spam, Computer Security Journal, CSI Computer Security Institute, vol. 19, No. 1, Jan. 2003, pp. 1-5.
Graham, P., A Plan for Spam, Online!, Aug. 2002, XP002273602, http://www.paulgraham.com/spam.html, retrieved on Mar. 12, 2004.
Cynthia Dwork, et al.; "Pricing Via Processing or Combatting Junk Mail"; Presented at Crypto '92; pp. 1-11.
Thorsten Joachims; "Text Categorization with Support Vector Machines: Learning with Many Relevant Features"; LS-8 Report 23, Nov. 1997, 18 pages.
Daphne Koller, et al.; "Hierarchically Classifying Doucments Using Very Few Words"; In ICML-97: Proceedings of the Fourteenth International Conference on Machine Learning; San Francisco, CA: Morgan Kaufmann 1997; 9 pages.
Ellen Spertus; "Smokey: Automatic Recognition of Hostile Messages"; Proceedings of the Conference on Innovative Applications in Artificial Intelligence (IAAI), 1997, 8 pages.
Hinrich Schutze, et al.; "A Comparison of Classifiers and Document Representations for the Routing Problem"; Proceedings of the 18th Annual International ACM SIGIR Conference on Research and Development in Information Retrieval, Seattle, WA, Jul. 9-13, 1995; pp. 229-237.
Yiming Yang, et al.; "A Comparative Study on Feature Selection in Text Categorization"; School of Computer Science, Carnegie Mellon University, Pittsburgh, PA, and Verity, Inc., Sunnyvale, CA; 9 pages.
David D. Lewis, et al.; "A Comparison of Two Learning Algorithms for Text Categorization"; Third Annual Symposium on Document Analysis and Information Retrieval; Apr. 11-13, 1994; pp. 81-93.
Mehran Sahami; "Learning Limited Dependence Bayesian Classifiers"; In KDD-96: Proceedings of the Second International Conference on Knowledge Discovery and Data Mining; AAAI Press, 1996; Menlo Park, CA; pp. 335-338.
William W. Cohen; "Learning Rules that Classify E-Mail"; In the Proceedings of the 1996 AAAI Spring Symposium on Machine Learning in Information Access. Downloaded from William Cohen's web page: http://www.research.att.com/nwcohen/pubs.html.
Makoto Iwayama, et al., Hierarchical Bayesian Clustering for Automatic Text Classification, Natural Language, 1995, pp. 1322-1327.
David D. Lewis, An Evaluation of Phrasal and Clustered Representations on a Text Categorization Task, 15th Annual Internatioanl SIGIR '92, Denmark 1992, pp. 37-50.
Daphne Koller, et al, Toward Optimal Feature Selection, Machine Learning Proc. of the Thirteenth International Conference, Morgan Kaufmann, 1996, 9 pages.
David Dolan Lewis, Representation and Learning in Information Retrieval, University of Massachusetts, 1992.
Tom Mitchell, Machine Learning, Carnegie Mellon University, Bayesian Learning, Chapter 6, pp. 180-184.
Juha Takkinen, et al., Cafe: A Conceptual Model for Managing Information in Electronic Mail, Laboratory for Intelligent Information Systems, Department of Computer and Information Science, Linkoping University, Sweden, Conference on System Sciences, 1998 IEEE.
Jacob Palme, et al., Issues When Designing Filters In Messaging Systems, Computer Communications, 1996, pp. 95-101, Stockholm, Sweden.
Richard B. Segal, et al., SwiftFile: An Intelligent Assistant for Organizing E-Mail, In Proceedings of the Third International Conference on Autonomous Agents, May 1999, 7 pages.
Mehran Sahami, et al., A Bayesian Approach to Filtering Junk E-Mail, AAAI Workshop on Learning for Text Categorization, Jul. 1998, 8 pages, Madison, Wisconsin, USA.
Y. H. Li, et al., Classification of Text Documents, The Computer Journal, vol. 41, No. 8, 1998; pp. 537-546.
David Madigan, Statistics and The War on Spam, Rutgers University, pp. 1-13, 2003.
Padraig Cunningham, et al., A Case-Based Approach to Spam Filtering that Can Track Concept Drift, In The ICCBR'03 Workshop on Long-Lived CBR Systems, Jun. 2003, 9 pages, Trondheim, Norway.
Mark Rosen, E-mail Classification in the Haystack Framework, Massachusetts Institute of Technology, Feb. 2003, 103 pages.
Kevin R. Gee, Using Latent Semantic Indexing to Filter Spam, Dept. of Computer Science and Engineering, University of Texas-Arlington, 5 pages, 2003.
John Wong, Preventing Spams and Relays, Linux Journal, Dec. 1998, 6 pages, vol. 1998 Issue 56es, Specialized Systems Consultants, Inc.
Meng Weng Wong, SPF Overview, Linux Journal, Apr. 2004, 6 pages, vol. 2004 Issue 120, Specialized Systems Consultants, Inc.
Stop, in the Name of Spam, Communications of the ACM, Nov. 1998, pp. 11-14, vol. 41 No. 11.
Eric Allman, Spam, Spam, Spam, Spam, Spam, Spam, the FTC, and Spam, Queue, Sep. 2003, pp. 62-69, vol. 1 Issue 6.
Tom Fawcett, "In vivo" Spam Filtering: A Challenge Problem for KDD, SIGKDD Explorations, Dec. 2003, pp. 140-148, vol. 5 Issue 2.
J.D.M. Rennie. ifile: An Application of Machine Learning to E-Mail Filtering, Proceedings of the KDD-2000 Workshop on Text Mining, Sixth ACM SIGKDD International Conference on Knowledge Discovery and Data Mining, 2000. 6 pages.
S. Argamon, et al., Routing documents according to style, In First International Workshop on Innovative Information Systems, 1998, 8 pages.

K. Mock, An Experimental Framework for Email Categorization and Management, Proceedings of the 24th Annual International ACM SIGIR Conference, 2001, pp. 392-393.

Jose Maria Gomez Hidalgo, Evaluating Cost-Sensitive Unsolicited Bulk Email Categorization, SAC 2002, 2002, pp. 615-620, Madrid, Spain.

A.Z. Broder, et al. Syntactic Clustering of the Web, SRC Technical Note, Digital Corporation, Jul. 25, 1997, 13 pages.

I. Androutsopoulos, et al., An Experimental Comparison of Naive Bayesian and Keyword-based Anti-spam Filtering with Personal E-mail Messages, Proceedings of the 23rd ACM SIGIR Conference, 2000, pp. 160-167.

P. Pantel, et al., SpamCop: A Spam Classification & Organization Program, In Proc. AAAI-1998 Workshop on Learning for Text Categorization, 1998, 8 pages.

G. Manco, et al., Towards an Adaptive Mail Classifier, In Proc. of Italian Association for Artificial Intelligence Workshop, 2002, 12 pages.

U.S. Appl. No. 10/208,105, filed Jul. 29, 2002, Andaker.
U.S. Appl. No. 09/893,941, filed Jun. 28, 2001, Horvitz.
U.S. Appl. No. 10/278,591, filed Oct. 23, 2002, Heckerman.
U.S. Appl. No. 10/180,565, filed Jun. 26, 2002, Goodman.
U.S. Appl. No. 09/497,992, filed Feb. 4, 2000, Maller.
U.S. Appl. No. 10/291,260, filed Nov. 8, 2002, Burrows.

Cormac O'Brien, et al., Spam Filters: Bayes vs. Chi-squared; Letters vs. Words, Proceedings of the 1st international symposium on Information and communication technologies, 2003, pp. 291-296, Dublin, Ireland.

Olle Balter, et al., Bifrost Inbox Organizer: Giving users control over the inbox, NordiCHI Oct. 2002, 2002, pp. 111-118, Arhus, Denmark.

Lorrie Faith Cranor, et al., Spam!, Communications of the ACM, 1998, pp. 74-83, vol. 41-No. 8.

P.Y. Simard, et al., Using Character Recognition and Segmentation to Tell Computer from Humans, International Conference on Document Analysis and Recognition (ICDAR), IEEE Computer Society, 2000, pp. 418-423.

S. Li et al., Secure Human-Computer Identification against Peeping: A Survey, Microsoft Research, 2003, 53 pages.

D.A. Turner et al., Controlling Spam through Lightweight Currency, In Proc. of the Hawaii International Conference on Computer Sciences, Jan. 2004, 9 pages.

D. Turner et al., Payment-based Email, 5th International Conference on Software Engineering, Artificial Intelligence, Networking, and Parallel/Distributed Computing, Jun. 2004, 7 pages.

Breiman, Friedman, Olshen, and Stone. "Classification and Regression Trees." Wadsworth & Brooks, Monterey, CA (1984).

Quinlan. "C4.5: Programs for Machine Learning." Morgan Kaufmann, San Francisco, CA (1993).

Hayes, Brian. "Spam, Spam, Spam, Lovely Spam." American Scientist Online, Jun. 30, 2003. pp. 1-6. vol. 91.

Partial European Search Report, EP05100847, mailed Jun. 21, 2005, 5 pages.

European Search Report, dated Jun. 9, 2005, mailed Aug. 22, 2005 for European Patent Application Serial No. EP04011978, 12 pages.

Written Opinion of the Internatioanl Preliminary Examining Authority mailed Nov. 30, 2005 for PCT/US03/41526, 5 pages.

International Search Report dated Jan. 17, 2006, mailed Jan. 31, 2006, for PCT Application Serial No. PCT/US04/05501, 2 Pages.

European Search Report dated Apr. 6, 2006 and mailed Apr. 6, 2006 for EP 04102242, 3 pages.

Graham. "The Future of SPAM" (2003) Computer Journal, CSI Computer Security Institute, vol. 19, No. 1, 6 pages.

How to Obscure Any URL, http://www.pc-help.org/obscure.htm, Last viewed on Jan. 18, 2003, 10 Pages.

European Search report dated Feb. 23, 2007, mailed Feb. 28, 2007 for European Patent Application Serial No. 05105308, 4 pages.

European Search Report dated Jul. 5, 2006, mailed Jul. 24, 2006 for European Application No. EP 06 01 2631, 3 pages.

Federal Trade Commission. "False Claims in Spam", A report by the FTC's division of marketing practices, Apr. 30, 2003, http://www.ftc.gov/reports/spam/030429spamreport.pdf.

Hansell. "Internet is losing ground in battle against spam", The New York Times: Technology section, Apr. 22, 2003.

Official Action from Patent Office of the Russian Federation, Application No. 2004116904, received on Apr. 23, 2009, 8 pages.

Official Decision on Grant from the Patent Office of the Russian Federation for Application No. 2004116904/09 (018264), mailed on Aug. 4, 2009, 6 pgs.

* cited by examiner

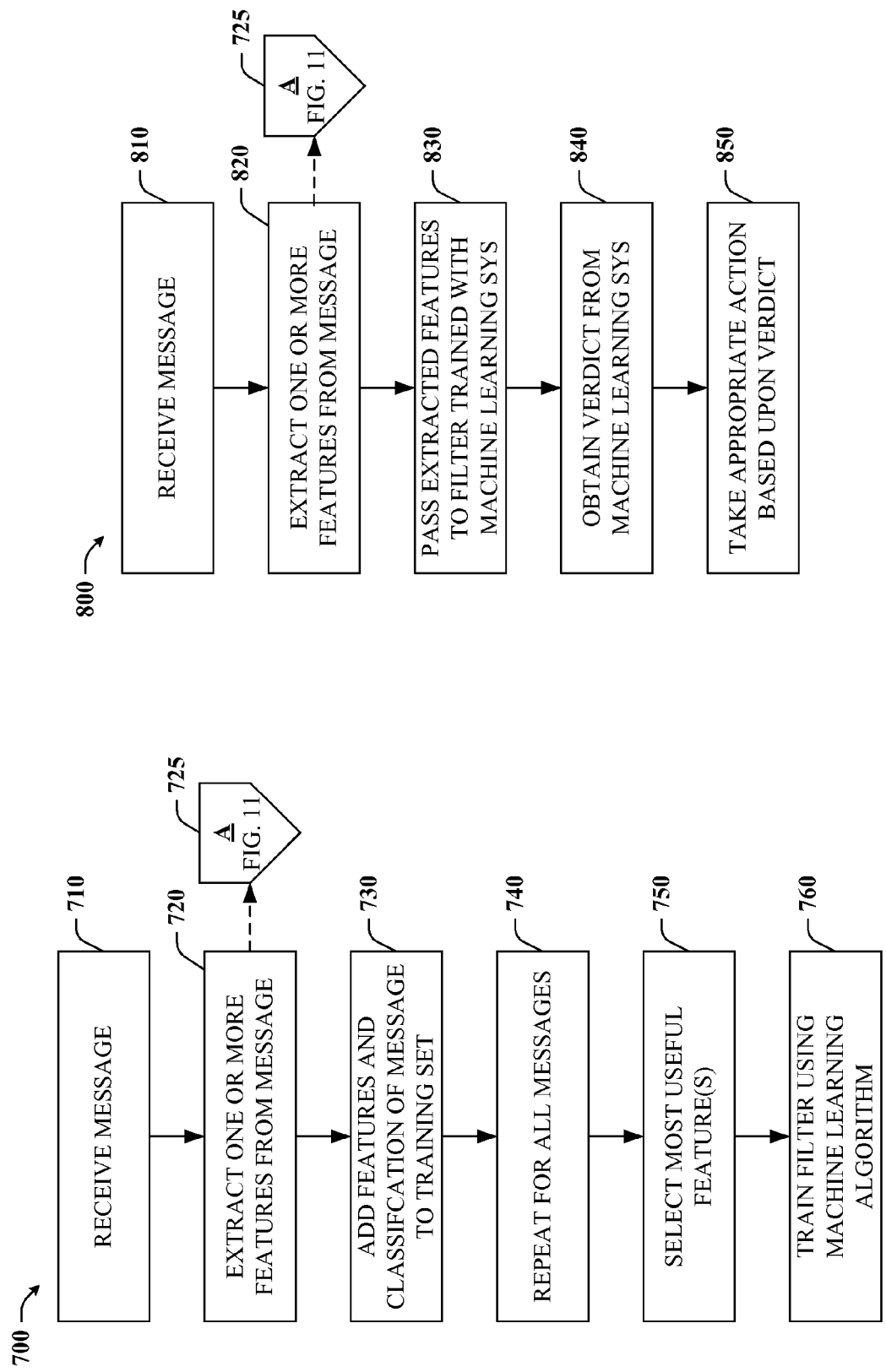

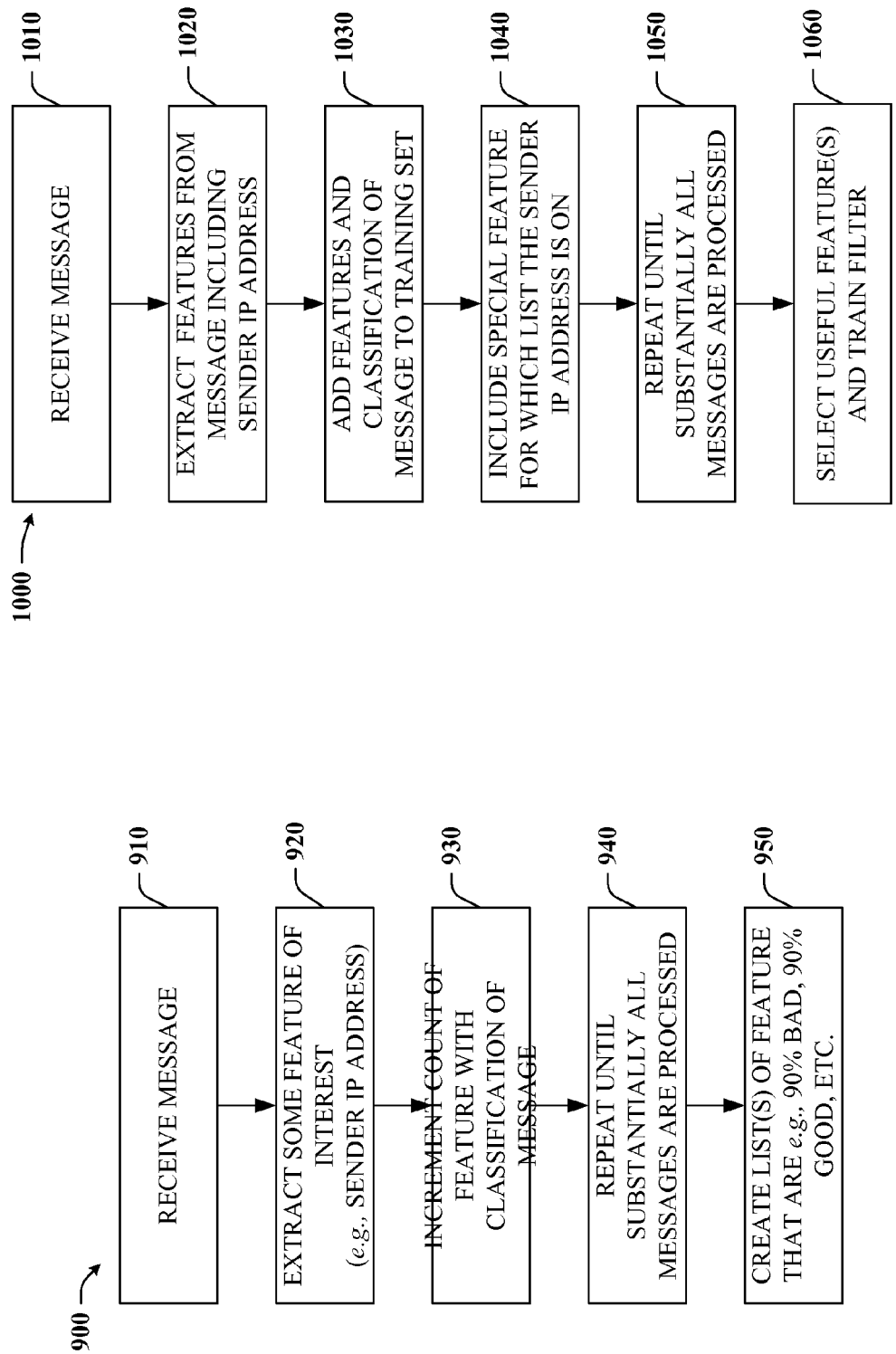

ORIGINATION/DESTINATION FEATURES AND LISTS FOR SPAM PREVENTION

CROSS REFERENCE TO RELATED APPLICATIONS

This application is a continuation of U.S. patent application Ser. No. 10/454,168, filed on Jun. 4, 2003, entitled "ORIGINATION/DESTINATION FEATURES AND LISTS FOR SPAM PREVENTION", the entirety of which is incorporated herein by reference.

TECHNICAL FIELD

This invention is related to systems and methods for identifying both legitimate (e.g., good mail) and undesired mail, and more particularly for processing electronic messages to extract data to facilitate spam prevention.

BACKGROUND OF THE INVENTION

The advent of global communications networks such as the Internet has presented commercial opportunities for reaching vast numbers of potential customers. Electronic messaging, and particularly electronic mail ("email"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, spam is now or soon will become a major threat to trustworthy computing.

A key technique utilized to thwart spam is employment of filtering systems/methodologies. One proven filtering technique is based upon a machine learning approach—machine learning filters assign to an incoming message a probability that the message is spam. In this approach, features typically are extracted from two classes of example messages (e.g., spam and non-spam messages), and a learning filter is applied to discriminate probabilistically between the two classes. Since many message features are related to content (e.g., words and phrases in the subject and/or body of the message), such types of filters are commonly referred to as "content-based filters".

With the onslaught of such spam filtering techniques, many spammers have thought of ways to disguise their identities to avoid and/or bypass spam filters. Thus, conventional content-based and adaptive filters may become ineffective in recognizing and blocking disguised spam messages.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Spammers can disguise almost all of the information in their messages. For instance, they can embed images, so that there are no words to use as features for a machine learning system. The images can even be distorted in ways that would make it difficult, or at least time-consuming, to use OCR software. Still, no matter how many features they remove, there is still useful information. First, the spammers must send the message from somewhere. We can detect what IP address the message was received from. Second, the spammers are almost always trying to sell something, and must therefore include a way to contact them. This could be a toll free number, but spammers, may be reluctant to use this, because of the high cost of complaints. It could be a non-toll free number, but spammers may be reluctant to do this, because of the lower response rate. Alternatively, it could be a URL (e.g., http://www.spamcorp.com/buyenlarger.htm). This URL could be embedded in an image to make it more difficult for filters and/or software to detect. However, spammers may be reluctant to do this because the user will need to type the URL in to their browser, which could lower response rates.

The most likely ways for spammers to be contacted are embedded links, or through an embedded email address of some sort. For instance, "click here to learn more" wherein the "click here" contains a link to a specific web page that the machine learning system can detect and use in accordance with one aspect of the present invention. Similarly, the address to be replied to (e.g., typically the "from address" but sometimes the "reply-to" address if there is one), or any embedded mailto: links (links that allow a mail message to be sent by clicking on the link), or any other embedded email addresses. Additionally, spammers often include images in messages. Because it is expensive to mail large images over and over, spammers often embed only a special link to the image, which causes the image to be downloaded. The locations that these links point to can also be used as features.

With respect to the information pulled from the mail from address, mail reply-to address, embedded mailto: addresses, external links, and links of external images, at least a portion of such information can be used as a feature of a machine learning system, with which a weight or probability is associated; or the information can be added to a list. For instance, we can keep lists of IP addresses or from addresses that send only spam, or only good mail, or more than 90% good mail, etc. The fact that a particular link or address is on such a list can be used either as a feature of a machine learning system, or as part of any other spam filtering system, or both.

The subject invention provides a system and method that facilitate identifying disguised spam messages by examining particular portions of the messages. More specifically, the present invention involves processing a message such as electronic mail (email) to extract origination and/or destination data to distinguish spam messages from legitimate messages. The processing includes various techniques to identify and parse IP address information, email address information, and/or universal resource locator (URL) information and to associate the extracted data with spam attributes (e.g., good user vs. bad user or good sender vs. bad sender). A bad user or bad sender would be considered a spammer (e.g., one who sends spam), for example.

The extracted data, or at least a portion thereof, can be used to generate feature sets for machine learning systems. Machine learning techniques examine the contents of messages to determine if the messages are spam. Spammers can obfuscate most of the contents of a message such as by putting most of their information in difficult-to-process images. However, the origin of the message cannot be fully disguised since the spammers need to provide some way for a recipient to easily contact them. Examples of such include using a link (e.g., URL) and/or an email address (e.g., IP address). These types of information or variations or portions thereof, can be employed as features of a spam detector. In particular, the information can be used to train a spam detector and/or spam filter by way of the machine learning systems, for example.

The present invention can also be cooperative with parental control systems. Parental controls systems can notify a user that a message is inappropriate and can also indicate a reason for such inappropriateness such as 'includes pornographic material.' According to one aspect of the present invention, one or more extracted and normalized features (e.g., a URL) can be passed through a parental control system or filter to obtain the parental control system's classification. This classification can be employed as an additional feature of the machine learning system to facilitate building and/or improving spam filters.

Furthermore, extracted features can be classified by type, can be weighted according to a degree of spaminess, and can be designated as either positive (e.g., more likely not spam) or negative (e.g., more likely to be spam) features. The features can also be utilized to create lists such as non-spammer lists and spammer lists, for example.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 7 is a flow diagram of an exemplary method in connection with training filters in accordance with an aspect of the present invention.

FIG. 8 is a flow diagram of an exemplary method in connection with employing a trained filter in accordance with an aspect of the present invention.

FIG. 9 is a flow diagram of an exemplary method in connection with creating lists in accordance with an aspect of the present invention.

FIG. 10 is a flow diagram of an exemplary method in connection with employing lists to train filters in accordance with an aspect of the present invention.

DETAILED DESCRIPTION OF THE INVENTION

Figure 1:
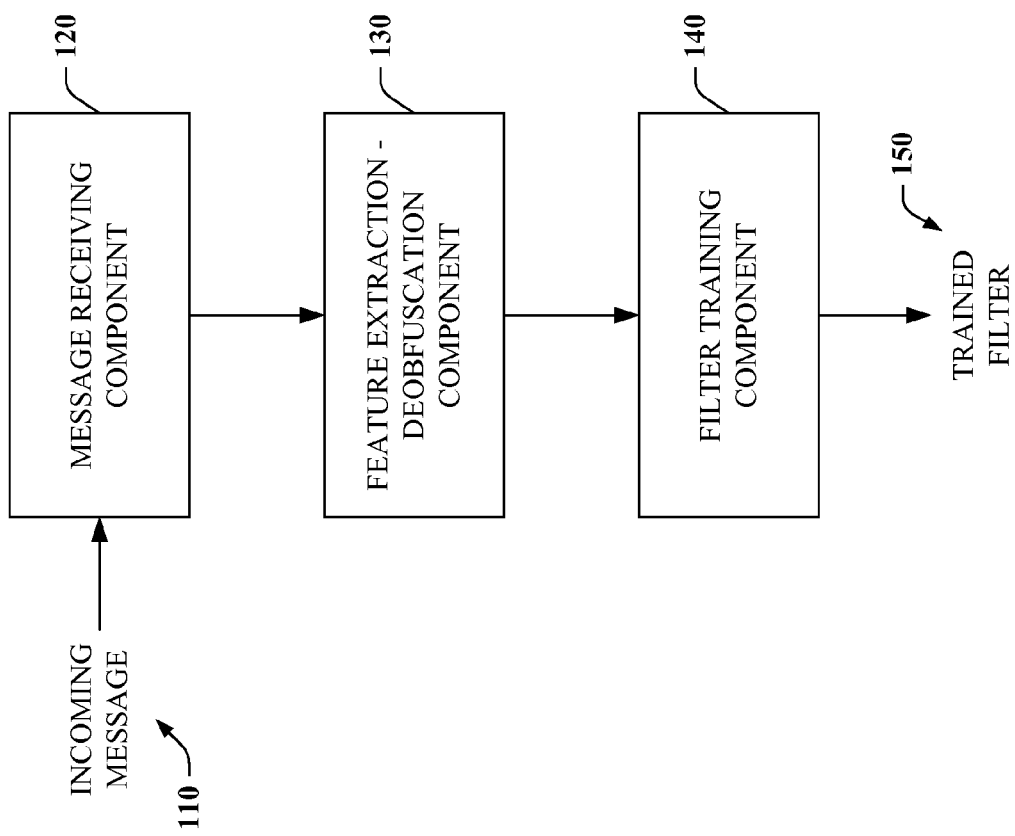
FIG. 1 is a high-level block diagram of a system that facilitates spam prevention in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating training data for machine learned spam filtering. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that although the term message is employed extensively throughout the specification, such term is not limited to electronic mail per se, but can be suitably adapted to include electronic messaging of any form that can be distributed over any suitable communication architecture. For example, conferencing applications that facilitate a conference between two or more people (e.g., interactive chat programs, and instant messaging programs) can also utilize the filtering benefits disclosed herein, since unwanted text can be electronically interspersed into normal chat messages as users exchange messages and/or inserted as a lead-off message, a closing message, or all of the above. In this particular application, a filter can be trained to automatically filter particular message content (text and images) in order to capture and tag as spam the undesirable content (e.g., commercials, promotions, or advertisements).

In the subject invention, the term "recipient" refers to an addressee of an incoming message or mail item. The term "user" can refer to a recipient or a sender, depending on the context. For example, a user can refer to an email user who sends spam and/or a user can refer to an email recipient who receives the spam, depending on the context and application of the term.

An Internet Protocol (IP) address is a 32 bit number typically representing a machine on the internet. These numbers are used when two machines communicate. They are typically represented in the form "xxx.xxx.xxx.xxx", where each xxx is between 0 and 255. Unfortunately, IP addresses are difficult to remember. Because of this, the "domain name" and "host name" conventions have been created. A "domain name" is the name of a group of machines on the internet (perhaps a single machine), and is typically of the form "x.com", or "y.edu", or "courts.wa.gov".

A Fully Qualified Domain Name (FQDN) is a particular machine on the internet, e.g., "b.x.com" or "c.y.edu" or "www.courts.wa.gov"; the domain name portion is "x.com" or "y.edu" or "courts.wa.gov" respectively. The "b", "c", and "www" portions, respectively, are called the host name portion of the FQDN. In general, an IP address can be used in any situation in which a domain name can be used (e.g., "DN/IP" indicates that both possibilities exist). Also in general, an IP address can be used in any situation in which an FQDN can be used (e.g., "FQDN/IP" indicates that both possibilities exist). An email address consists of a user name and a domain name or IP address (DN/IP), e.g., "a@x.com" or "a@1.2.3.4". In both examples, the user name is "a."

Uniform Resource Locators (URLs) are typically of the form "service-name:FQDN/IP/url-path." For instance, "http://www.microsoft.com/windows/help.htm" is a URL. The portion "http" is the service name. The portion "www-.microsoft.com" is the FQDN and "windows/help.htm" is the URL-path. This is somewhat of a simplification of URLs, but sufficient for the present discussion.

Referring now to FIG. 1, there is illustrated a general block diagram of a feature extraction and training system 100 in accordance with an aspect of the present invention. The feature extraction and training system 100 involves processing incoming messages 110 to extract data or features from the messages. Such features can be extracted from at least a portion of the origination and/or destination information provided in the message and/or variations thereof. In particular, one or more incoming messages 110 can be received by the system 100 via a message receiving component 120. The message receiving component 120 can be located on an email or message server, for example, to receive the incoming messages 110. Though some messages (e.g., at least one) can be vulnerable to an existing filter (e.g., spam, junk mail, parental control filter), and thus diverted to a trash bin or junk mail folder, at least a portion of the origination and/or destination data can be extracted and deobfuscated for use in connection with a machine learning system or with populating a feature list.

The message receiving component 120 can pass the incoming messages, or a subset thereof, to a feature extraction component 130. The feature extraction component 130 can extract data from the respective messages 110 in order to generate feature sets to facilitate filter training and ultimately spam detection. The data or features extracted from the messages relate to origination and/or destination information found and/or embedded therein. Examples of data or features include a received-from IP address, a reply-to email address, a cc: (e.g., carbon copy) email address, URLs of various sorts (including text-based links, image-based links, and URLs or portions thereof in text form), a non-toll free telephone number (e.g., particularly an area code), toll-free telephone number, a mailto: email address link, a text form email address, a FQDN in a SMTP HELO command, a SMTP MAIL FROM address/return-path address, and/or at least a portion of any of the above.

The feature extraction component 130 can perform any suitable number of processes to extract various sets of features from the message 110 for subsequent use in machine learning systems. In addition or alternatively, the sets of features can be used to populate lists for other filter training techniques.

FQDNs such as a.x.com, for instance, can be translated into numbers generally referred to as an IP address. The IP address is typically observed in a dotted decimal format comprising four blocks of numbers. Each block is separated by a dot or decimal point and each block of numbers can range from 0 to 255, wherein each variation of numbers corresponds to a different internet name. For example, a.x.com could translate to 123.124.125.126 whereas 121.124.125.126 could represent qrstuv.com. Because numbers are not as easily recognizable or memorable as words, IP addresses are usually referred to by their respective FQDNs. The same IP address in dotted decimal format can also be expressed in alternative formats which will be discussed below.

According to one aspect of the subject invention, the feature extraction component 130 can focus on the received-from IP address(es) included in the message 110. The received-from IP address is based at least in part upon the received-from IP information. Generally, mail sent over the Internet is transported from server to server involving as few as two servers (e.g., a sender and a receiver) at times. In even rarer occurrences, a client can send directly to a server. In some cases, many more servers can be involved such that mail or messages are sent from one server to another due to the presence of firewalls, for example. In particular, some servers can be located on the inside of a firewall, and thus can only communicate with designated servers on the other side of the firewall. This causes an increase in the number of hops the message takes to get from the sender to the receiver. The received-from lines comprising the IP addresses facilitate tracing the path of the message to ascertain where the message came from.

As the message 110 travels from server to server, each server which is contacted prepends the identity of the IP address that it received the message from to a received-from field (i.e., "Received:" field) of the message, as well as the name of the alleged FQDN of the server it is talking to. This FQDN is told to the receiving server by the sending server, through the HELO command of the SMTP protocol, and thus cannot be trusted if the sending server is outside the organization. For example, the message can have five received from lines with 5 IP addresses and FQDNs prepended, thus indicating that it has passed through six different servers (i.e., been passed 5 times), with the lines in the reverse order in which they were prepended (i.e., latest first). However, each server has the ability to modify any lower (earlier prepended) lines. This can be particularly problematic especially when the message has traveled between multiple servers. Because each intermediate server is capable of altering any earlier written (lower) received-from lines, spammers can prepend fake IP addresses to the received-from lines of the message to disguise the received-from IP information or sender of the spam message. For example, a spam message may initially appear as if it was sent from trusteddomain.com, thus misrepresenting the true source of the message to the recipient.

It is important for spam software to readily identify an IP address outside the organization that sent to a server inside the organization. Since this IP address is written by the receiving server, inside the organization, it can be trusted as the correct IP address. All other IP addresses outside the organization cannot be trusted, since they were written by servers outside the organization, and thus, possibly modified. There may be many IP addresses of the sending servers involved in the path to the recipient organization, but since only one can be trusted, we refer to this one trustworthy one as the "sender's" IP address.

One way for spam filtering software to find this sender's IP address is to know the mail server configurations at an organization. In general, if one knows which machines pass to which other machines in which situations, one can determine the sender's IP address. However, it may not be convenient to describe the server configuration, especially for spam filtering software installed on email clients. An alternate approach involves utilizing MX records to determine the true source of a message. MX records list, for each domain name, the FQDNs of recipients of email for that domain. One can trace back through the received from list until an IP address is found that corresponds to an FQDN corresponding to an entry in the domain's MX record. The IP addresses that this machine received from is the sender's IP address. Imagine that 1.2.3.101 is the only MX record for x.com. Then by finding the line that received from 1.2.3.101, one can know the next line corresponds to x.com's incoming mail server, and thus that the IP address in that line corresponds to the IP address that sent to x.com.

The table below depicts an exemplary analysis as discussed supra of determining the true source of a message:

| line | comment |
| --- | --- |
| Received: from a.x.com ([1.2.3.100]) by b.x.com Tue, 22 Apr 2003 13:11:48-0700 | Internal to x.com |
| Received: from mailserver.x.com ([1.2.3.101]) by b.x.com Tue, 22 Apr 2003 12:11:48-0700 | 1.2.3.101 is an MX record for x.com so we know next line is first internal to x.com |
| Received: from outside.com ([4.5.6.7]) by mailserver.x.com Tue, 22 Apr 2003 11:11:48-0700 | This is where x.com received the message; this is the last trusted line. Use 4.5.6.7 as sender's IP address |
| Received: from trustedsender.com ([8.9.10.11]) by outside.com Tue, 22 Apr 2003 10:11:48-0700 | This line may be fake, constructed by server at 4.5.6.7 |

Currently, there is no accepted standard for listing outgoing mail servers, and this heuristic can fail if, for instance, IP addresses internal to an organization are different than those external to an organization, or if an organization sends mail from one machine listed in an MX record indirectly to another machine listed in an MX record. Further, in the special case where the sender's IP as found above is found to be internal to the organization, as could happen if one machine in the MX record sent to another in the MX record, the process is continued as above. In addition, certain IP addresses can be detected as internal (because they are of the form 10.x.y.z or 172.16.y.z through 172.31.y.z or 192.168.0.z through 192.168.255.z, a form used only for internal IP addresses); any address internal to an organization can be trusted. Finally, if a received from line is of the form "Received from a.x.com [1.2.3.100]" and an IP address lookup of a.x.com yields 1.2.3.100 or a reverse IP address lookup of 1.2.3.100 yields a.x.com and if x.com is the organization, then the next line can also be trusted.

Using these observations, it is often possible to find the sender's IP address. Exemplary pseudocode is as follows:

```
bool fFoundHostInMX;
if (external IP address of MX records matches internal IP
address of MX records)
{
    fFoundHostInMX = FALSE; # it's worth looking for
} else {
    fFoundHostInMX = TRUE; # it's not worth looking for,
pretend we already found it
}
for each received from line of the form Received from
a.b.c [i.j.k.l] {
    if i.j.k.l in MX records of receiver domain
    {
        fFoundHostInMX = TRUE;
        continue;
    }
    if not fFoundHostInMX
    {
        # Has not yet gone through an MX record, must be
internal
        continue;
    }
    if i.j.k.l is of form
        10.x.y.z or
        172.16.y.z to 172.31.y.z or
        192.168.0.z to 192.168.255.z
    {
        # Must be internal
        continue;
    }
    if DNS lookup of a.b.c yields i.j.k.l and b.c is
receiver domain
    {
        # Must be internal
        continue;
    }
    Output sender's alleged FQDN a.b.c and sender's
actual IP address i.j.k.k
}
If we reach here, then Error: unable to identify sender's
alleged FQDN and sender's actual IP address
```

Many things can be done with the sender's IP address, as with other origination and destination features. First, they can be added to a list of uniformly bad senders, sometimes known as a Black List. The Black Lists can be employed subsequently to filter, block, or redirect untrustworthy messages to an appropriate folder or location where they can be further investigated.

Other types of lists can also be generated and implemented as filters on both client- and server-based architectures. In the client architecture, a user can inform the client email software who he should be receiving mail from (e.g., mailing lists, individuals, etc). A list of records corresponding to trusted email addresses can be generated either manually or automatically by the user. Accordingly, imagine that a sender having an email address 'b@zyx.com' sends the user an email message. The sender's email address b@zyx.com comprises a user name, 'b', and an FQDN/IP 'zyx.com'. When the client receives the incoming message 110 from the sender (b@zyx.com), it can search a trusted sender list for the user's email address to determine if the user has indicated that 'b@zyx.com' is a valid and trusted address. For server architectures, the lists can be located directly on the server. Therefore, as messages arrive at the message server, their respective features (e.g., sender's IP address, domain name(s) in MAIL FROM or HELO fields, and other origination and/or destination information) can be compared to the lists located on the message server. Messages that are determined to be from valid senders can be delivered to the intended recipients according to either client-based or server-based delivery protocols. However, messages determined to include origination or destination features in lists of questionable or bad features can be moved to a spam or junk mail folder for discard, or otherwise specially treated.

As an alternative to populating lists of trusted or bad origination features, the sender's origination features (e.g., IP address, alleged From address) can be extracted as one or more features and later used in connection with machine learning techniques for filter building and/or training.

The IP address can be derived from an email address (e.g., IP lookup on the FQDN in the sender's address or reply-to address) in any part of a message header or from an IP address lookup of the domain name portion of a URL link embedded in a body of the message, or directly from an IP address if it occurs as the FQDN/IP portion of a URL. Furthermore, as will be described later, the IP address has several attributes, each of which can be utilized as a feature of a machine learning system or as an element on a user-populated list. Thus, in a second approach, the feature extraction component 130 can exploit the many subparts of the IP address(es) to generate additional features.

Any combination of features as described above can be extracted from each incoming message 110. Messages can be randomly, automatically, and/or manually selected to participate in feature extraction, although typically all messages can be used. The extracted sets of features are subsequently applied to a filter training component 140 such as machine learning systems or any other system that builds and/or trains filters 150 such as spam filters.

Figure 2:
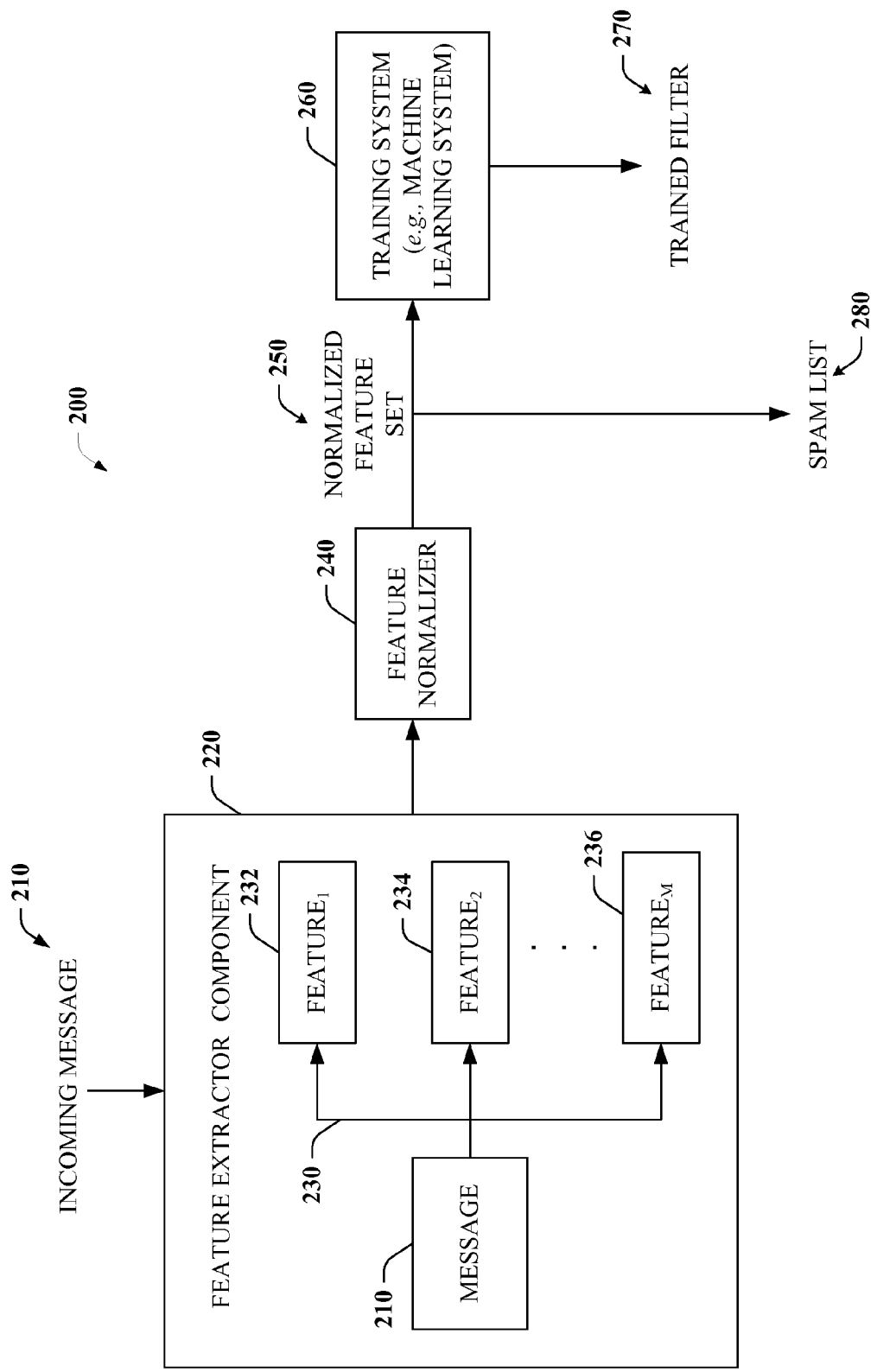
FIG. 2 is a block diagram of a system that facilitates spam prevention by extracting one or more features from incoming messages in accordance with an aspect of the present invention.

Referring now to FIG. 2, there is illustrated a feature extraction system 200 that facilitates deobfuscating or normalizing one or more features of an incoming message 210 in accordance with one aspect of the present invention. Ultimately, a filter(s) can be built based at least in part upon one or more of the normalized features. The system 200 comprises a feature extractor component 220 that receives an incoming message 210 either directly as shown or indirectly by way of a message receiver (FIG. 1), for example. Incoming messages selected for or participating in feature extraction can be subjected to the system 200, according to user preferences. Alternatively, substantially all incoming messages can be available for and participate in the feature extraction.

Feature extraction involves pulling out one or more features 230 (also referred to as feature1 232, feature2 234, and featurem 236, where M is an integer greater than or equal to one) associated with origination and/or destination information from the message 210. Origination information can relate to elements indicating the sender of the message as well as server domain names and related identification information that specifies from where the message came. Destination information can relate to elements of a message indicating to whom or where the recipient can send his response to the message. Origination and destination information can be found in a header of the message as well as in the body of the message either visible or invisible (e.g., embedded as text or in image) to the message recipient.

Because spammers tend to disguise and/or obfuscate their identity frequently to avoid detection by conventional spam filters, the system 200 comprises a feature normalizer component 240 that facilitates deobfuscating the one or more extracted features 230, or at least portions thereof. The feature normalizer component 240 can process and/or breakdown the extracted features 230 such as by analyzing the extracted features 230 (e.g., the FQDN—consulting a directory of blocks and MX records and/or translating the FQDN according to its current format) and then comparing them to a database(s) of existing spammer lists, non-spammer lists, and/or parental control lists, for example. In some cases as discussed infra in FIG. 4, such as when the extracted feature is a URL, prefixes and/or suffixes may also be removed to facilitate normalizing the feature and identifying whether the URL points to a spammer's website or to a legitimate source.

Once the features are normalized, at least a subset of them 250 can then be employed by a training system 260 such as a machine learning system, to build and/or update a filter(s) 270. The filter(s) can be trained for use as a spam filter and/or a junk-mail filter, for example. Furthermore, the filter(s) can be built and/or trained with positive features such as those which indicate a non-spam source (e.g., sender's From email address, sender's IP address, embedded telephone numbers, and/or URL) and/or a non-spam sender as well as with negative features such as those that identify and are associated with a spammer.

Alternatively or in addition, the set of features can be utilized to populate a new or add to an existing spam feature list 280. Other lists can also be generated to correspond to the particular extracted features such as a list of good addresses, a list of bad addresses, a list of good URLs, a list of bad URLs, a list of good telephone numbers, and a list of bad telephone numbers. Good feature lists can identify non-spammers, historically legitimate senders, and/or senders having a higher likelihood of non-spamminess (e.g., ~90% chance not spam source). Conversely, bad feature lists can correspond to spammers, potential spammers, and/or senders having a relatively higher likelihood of spamminess (e.g., ~90% spam source).

Referring now to FIGS. 3-6, there are illustrated exemplary features which can be derived and extracted from an IP address, a FQDN, an email address and a URL, respectively, to facilitate spam detection and prevention in accordance with several aspects of the present invention.

Figure 3:
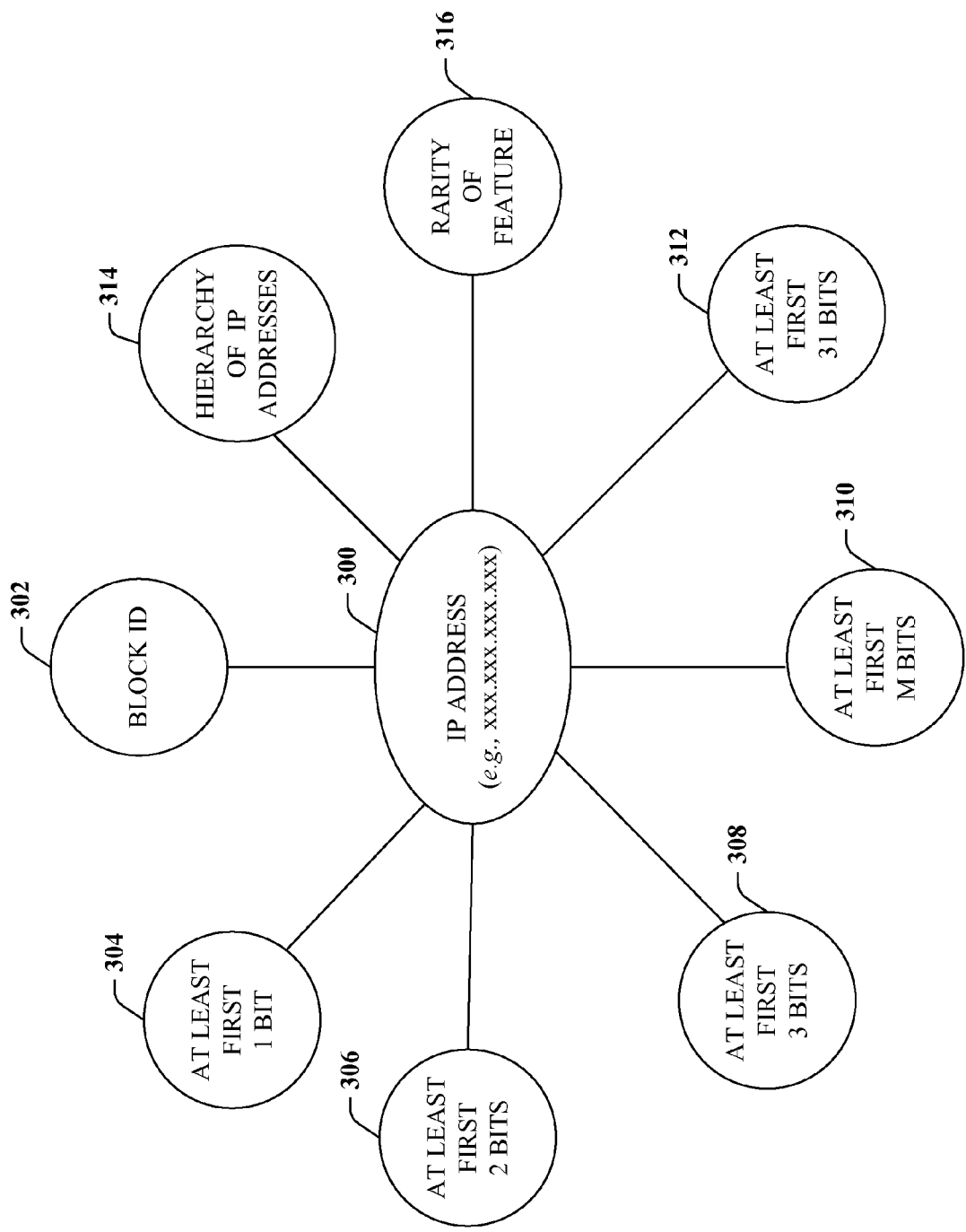
FIG. 3 is a schematic diagram of a plurality of features which can be extracted from an IP address in accordance with an aspect of the present invention.

FIG. 3 depicts an exemplary breakdown of an IP address 300 in accordance with an aspect of the present invention. An IP address 300 is 32 bits long and allocated into blocks (e.g., netblocks) when expressed in dotted decimal format (e.g., 4 blocks of up to 3 digits each, wherein each block is separated by periods and wherein each block of 3 digits is any number divisible between 0 and 255). The blocks are assigned to classes such as Class A, Class B, and Class C. Each block comprises a set number of IP addresses wherein the number of IP addresses per block varies according to the class. That is, depending on the class (i.e., A, B, or C), there can be more or less addresses assigned per block. The block size is usually a power of 2 and a set of IP addresses in the same block will share the first k binary digits and differ in the last 32-k (e.g., 32 minus k) binary digits. Thus, each block can be identified (block ID 302) according to its shared first k bits. In order to determine the block ID 302 associated with the particular IP address 300, a user can consult a directory of blocks such as arin.net. Moreover, the block ID 302 can be extracted and employed as a feature.

In some circumstances, however, the block ID 302 cannot be readily determined even by referencing arin.net because groups of IP addresses within a block can be sold up divided and re-sold any number of times. In such instances, a user or extraction system can make one or more guesses at the block IDs 302 for the respective IP addresses. For example, the user can extract at least a first 1 bit 304, at least a first 2 bits 306, at least a first 3 bits 308, at least a first M bits 310 (i.e., M is an integer greater or equal to one) and/or up to at least a first 31 bits 312 as separate features for subsequent use by a machine learning system and/or as elements on a feature list(s) (e.g., good feature lists, spam feature lists, etc.).

In practice, for instance, the first 1 bit of an IP address can be extracted and employed as a feature to determine whether the IP address points to a spammer or non-spammer. The first 1 bit from other IP addresses extracted from other messages can be compared to facilitate determining at least one block ID. Identifying at least one block ID can then assist discerning whether the message is from a spammer. Moreover, IP addresses which share the first M bits can be compared with respect to their other extracted features to ascertain whether the IP addresses are from legitimate senders and/or whether the respective messages are spam.

IP addresses can also be arranged hierarchically (314). That is, a set of high order bits may be allocated to a particular country. That country can allocate a subset to an ISP (Internet Service Provider), and that ISP may then allocate a subset to a particular company. Accordingly, various levels can be meaningful for the same IP address. For example, the fact that an IP address comes from a block allocated for Korea could be useful in determining whether the IP address is associated with a spammer. If the IP address is part of a block allocated to an ISP with a strict policy against spammers, this also could be useful in determining that the IP address is not associated with a spammer. Hence, by employing each of the first 1-31 bits of an IP address in combination with the hierarchal arrangement 314 of at least a subset of IP addresses, a user can automatically learn information at different levels without actually knowing the manner in which an IP address was allocated (e.g., without knowing the block IDs).

In addition to the features discussed above, a feature's rarity 316 (e.g., occurrence of feature is not common enough) can be determined by performing suitable calculations and/or employing statistical data comparing the frequency or count in which the feature appears in a sampling of incoming messages, for instance. In practice, an uncommon IP address 300 may be an example of a dial-up line being used to deliver email, which is a tactic often used by spammers. Spammers tend to modify their identity and/or location frequently. Thus, the fact that a feature is common or uncommon may be useful information. Hence, a feature's rarity 316 can be used as a feature of the machine learning system and/or as a part of at least one list (e.g., rare feature list).

Figure 4:
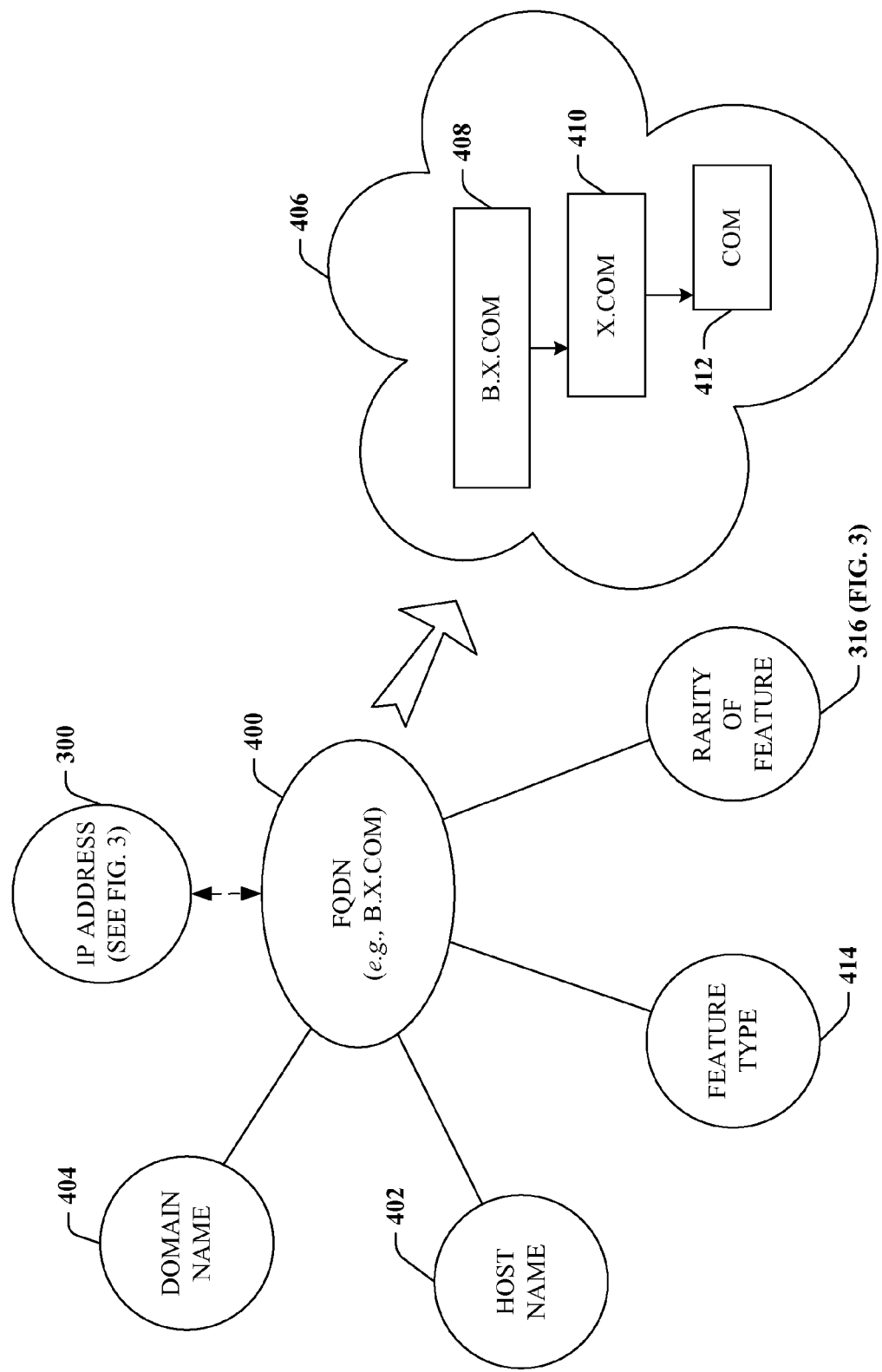
FIG. 4 is a schematic diagram of a plurality of features which can be extracted from a FQDN in accordance with an aspect of the present invention.

FIG. 4 demonstrates an exemplary feature breakdown of a FQDN 400, such as for example, b.x.com. The FQDN 400 can be extracted from a HELO field, for instance, (e.g., sender's alleged FQDN) and typically comprises a host name 402 and a domain name 404. The host name 402 refers to a particular computer, which is "b" according to the example. The domain name 404 refers to the name of at least one machine or a group of machines on the internet. In the instant example, "x.com" represents the domain name 404. A hierarchal breakdown of the FQDN 400 is represented by 406. In particular, B.X.COM 408 (full FQDN 400) can be partially stripped down to X.COM 410 (partial FQDN), which then can be stripped down to COM 412 (partial FQDN), whereby each partial FQDN can be employed as a feature.

Some features, such as received-from information, exist primarily as IP addresses. Thus, it may be useful to convert the FQDN 400 to an IP address 300 that can be broken down into additional features (as shown in FIG. 3) because it is relatively easy to create new host names and domain names, but relatively difficult to obtain new IP addresses.

Unfortunately, owners of a domain can make apparently different machines all map to the same place. For instance, the owner of a machine named "a.x.com" could be the same as the owner of "b.x.com" which could be the same owner of "x.com". Thus, the spammer could easily mislead a conventional filter to believe that the message is from the FQDN 400 "b.x.com" instead of from the domain 404 "x.com", thereby allowing the message to pass by the spam filter when in actuality, the domain 404 "x.com" would have indicated that the message was spam or was more likely to be spam. Hence, it can be useful to strip the address down to simply the domain name 404 when extracting the origination and/or destination information of the message. Alternatively or in addition, the full FQDN 400 can be extracted as a feature.

In some cases, additional resources are available, such as parental control systems. These resources can often assign a "type" or qualitative assessment, such as pornographic or violent, to host names and/or to URLs. The extracted features can be further classified by type, using such a resource. The feature type 414 of the feature can then be used as an additional feature in connection with building and/or training improved spam related filters. Alternatively, lists can be generated corresponding to different feature types which have previously been identified. The features types 414 can include, but are not limited to, sex or pornographic related features, racial and/or hate-speech related features, physical enhancement features, income or financial solutions features, home-buying features, etc. which identify general subject matter of messages.

Finally, the rarity of a feature 316 or of a feature type (see FIG. 3, supra) can be another feature as discussed above in FIG. 3. For example, a feature extracted from a message such as the host name "B" 402 from the FQDN 400 "b.x.com" may be a common example of the feature type: pornographic material. Therefore, when this feature is extracted from the message and then found on a pornographic material feature list, it can be concluded that the message is more likely to be spam, or is unsuitable/inappropriate for all ages, or constitutes adult content (e.g., adult rating), and the like. Thus, each list can comprise the more common features of that particular type. Alternatively, the corresponding IP address may be commonly found in spam messages in general and thus designated as a common feature of spam. Moreover, a feature's commonality and/or rarity can be employed as a separate feature for machine learning or other rule-based systems.

Figure 5:
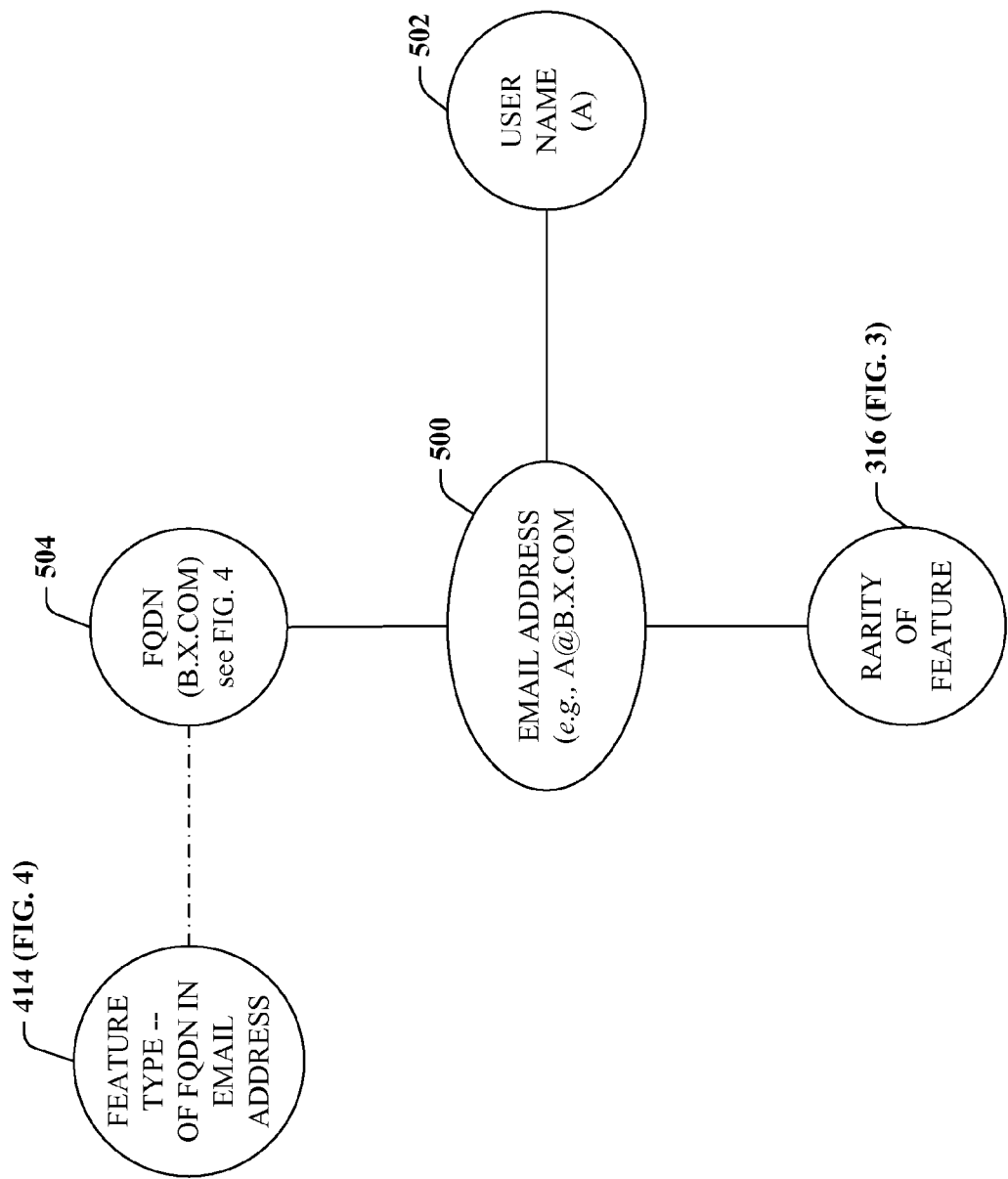
FIG. 5 is a schematic diagram of a plurality of features which can be extracted from an email address in accordance with an aspect of the present invention.

FIG. 5 demonstrates an exemplary feature breakdown of an email address 500: a@b.x.com, which includes a FQDN 400 as well as a few additional features, such as a user name 502. The email address 500 can be extracted from the From field, the cc (carbon copy) field, and the reply-to field of a message, as well as from any of the mailto: links in the body of the message (e.g., mailto: links are a special kind of link that when clicked, generates mail to a particular address), and, if available, from the MAIL FROM command used in the SMTP protocol. Email addresses 500 can also be embedded as text in the body of the message. In some cases, the message content may direct a recipient to use the 'reply all' function when responding to the message. In such cases, the addresses in the cc field and/or at least a portion of those included in the 'to' field (if more than one recipient is listed) would also be replied to. Thus, each of these addresses could be extracted as one or more features to facilitate spammer identification and prevention.

The email address 500 'a@b.x.com' can be broken down to various elements or subparts and those elements can be extracted and employed as features as well. In particular, the email address comprises a user name 502 and an FQDN 504 (e.g., see FQDN 400 in FIG. 4) which can be broken down even further into additional features. For several practical reasons, such as ease of use, recognition, and recollection, email addresses are usually notated using FQDNs rather than IP addresses.

In the current example, 'a@b.x.com' comprises the user name 502 "a". Thus, "a" can be extracted as one feature. Likewise, the FQDN 504 "b.x.com" can be extracted from the email address as at least one other feature. The FQDN 504 portion of the email address 500 can be passed through a parental control filter in order to facilitate determining the feature type 414, which is described in greater detail, supra, in FIG. 4. Hence, the feature type as it relates to the FQDN portion of the email address 500 can be used as an additional feature.

Figure 6:
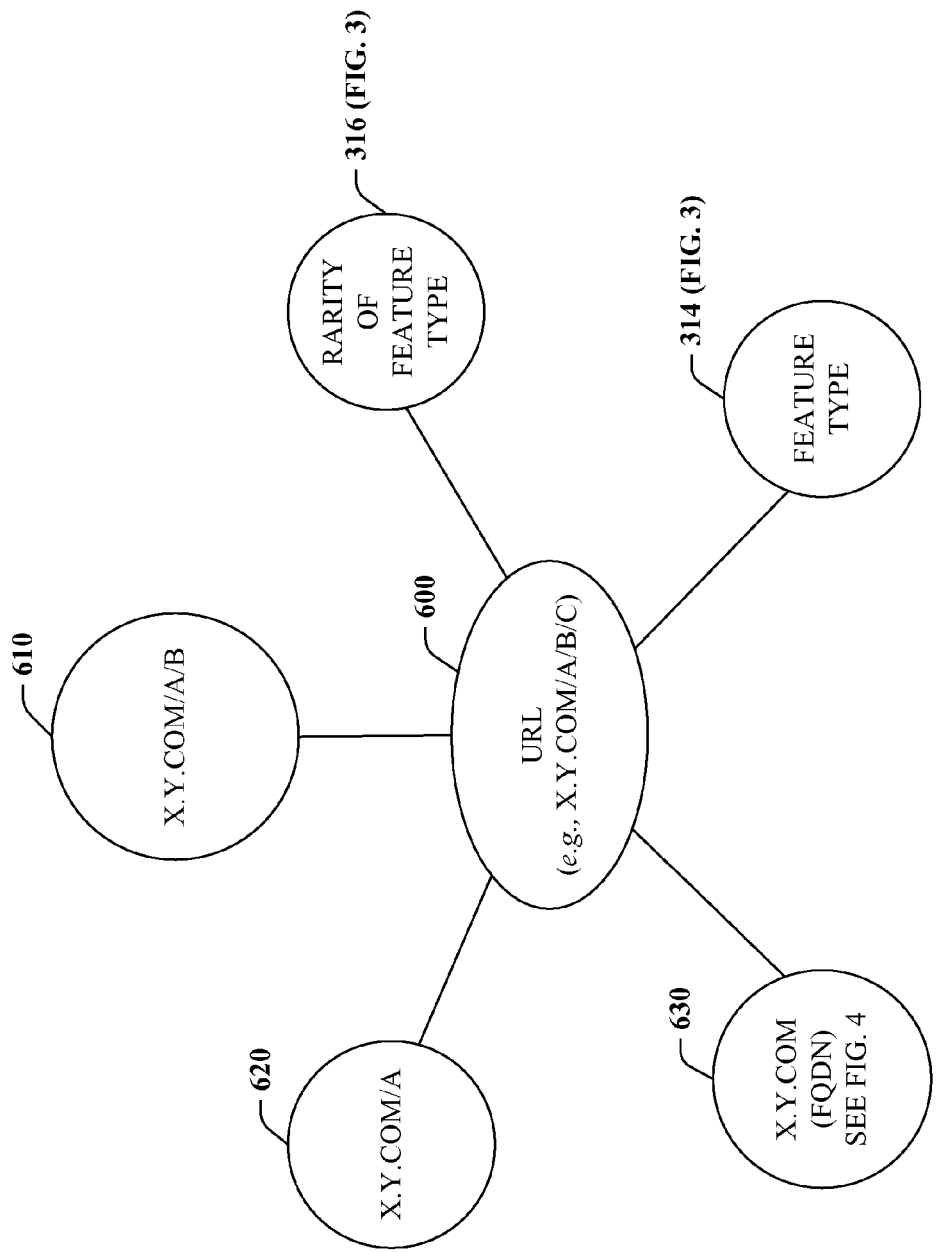
FIG. 6 is a schematic diagram of a plurality of features which can be extracted from a URL or web address in accordance with an aspect of the present invention.

In addition to email addresses, spammers are often contacted through URLs. FIG. 6 depicts an exemplary URL 600 (e.g., x.y.com/a/b/c) along with a plurality of features extracted therefrom in accordance with an aspect of the present invention. The URL 600 can be embedded as text in the body of the message and/or as an image in the body of the message. For example, spam messages can include pointers to websites, thereby directing a recipient to the spammer's webpage or related site.

URLs can be deobfuscated in a similar manner with respect to IP addresses. Initially, any prefix (e.g., service name) such as http://, https://, ftp://, telnet://, for example, can be removed before deobfuscating the URL 600. In addition, if an "@" symbol (e.g., % 40 in hex notation) appears amid the URL, anything between the prefix (e.g., http://) and the "@" symbol can be removed before normalizing the URL 400. Incorporating text between the prefix and the "@" symbol can be another tactic or form of trickery by spammers to confuse the message recipient as to the true page location the recipient is being directed to.

For example, http://www.amazon-.com@121.122.123.124/info.htm appears to the message recipient as if this page is located at www.amazon.com. Thus, the recipient may be more inclined to trust the link and more importantly, the message sender. On the contrary, the true page location is at "121.122.123.124" which may in fact correspond to a spam-related webpage. In some cases, however, legitimate senders may incorporate authentication information such as a login name and password in this portion of the URL 400 to facilitate an automatic login.

Once normalized and deobfuscated, the URL 600 can essentially be expressed as x.y.com/a/b/c, where x.y.com 630 is the name of the machine (FQDN) and a/b/c (e.g., suffix(s)) is the location of a file on that machine. If x.y.com/a/b/c 600 identifies a spammer(s), then x.y.com/a/b 610 and x.y.com/a 620 most likely identify the same or a related spammer(s) as well. Thus, the end portion or pathway of the URL 600 can be stripped off one part at a time, for example, to obtain additional features for a machine learning system or list. This makes it more difficult for spammers to create many different locations that all actually lead to them in such a way that a pattern is not noticed.

When the suffixes have been stripped off, the FQDN 630 can be further parsed to obtain additional features as previously discussed, supra, in FIG. 4. Furthermore, the FQDN 630 can also be converted into an IP address as demonstrated in FIG. 3, supra. Accordingly, various features related to the IP address can also be used as features.

Some URLs are written with an IP address instead of an FQDN, (e.g., dotted decimal format) such as nnn.nnn.nnn.nnn/a/b/c. The suffixes can be removed in successive order beginning with the "c" and at each stage, the resulting (partial) URL can be used as a feature (e.g., nnn.nnn.nnn.nnn/a/b; nnn.nnn.nnn.nnn/a; and nnn.nnn.nnn.nnn are all possible features to extract from the URL in dotted decimal format). Following, the IP address (e.g., free of suffixes and prefixes) can be used as a feature. It can then be mapped to its netblock. If the netblock is not ascertainable, then multiple guesses can be made using each of the first 1, 2, . . . and up to a first 31 bits of the IP address as separate features (see FIG. 3).

In addition to the dotted decimal format, the IP address can be expressed in dword (double word) format (e.g., two binary words of 16 bits each in base 10), in octal format (e.g., base 8), and hexadecimal format (e.g., base 16). In practice, spammers can obfuscate an IP address, a URL, a MAILTO link, and/or a FQDN by, for example, encoding the domain name portion using % nn notation (where nn is a pair of hex digits).

Some URLs can include redirectors which may be employed to confuse or trick the user. A redirector is a parameter or set of parameters following a "?" in the IP address of the URL that instruct a browser to redirect itself to another web page. For example, the URL may appear as "www.intendedpage.com?www.actualpage.com," wherein the browser actually points to "www.actualpage.com" and loads that page instead of the anticipated "www.intendedpage-.com" page. Hence, parameters contained within a URL can also be considered for extraction as features.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 7, there is illustrated a flow diagram of an exemplary process 700 that facilitates training a filter in accordance with an aspect of the present invention. The process 700 can begin with receiving a message (e.g., at least one message) at 710. The message(s) can be received by a server, for example, where an existing filter (e.g., a spam filter) can classify that the message is likely spam or unlikely spam based at least in part upon a set of criteria previously learned by the filter. The message can be parsed to extract one or more features therefrom at 720. The extraction of features is described in further detail at 725 (infra at FIG. 11). Examples of features include information (e.g., sender's IP address) located in a received from field, reply-to field, cc field, mailto field, MAIL FROM SMTP command, HELO field, URL address embedded in the text or as an image, and/or a non-toll free telephone number (e.g., area code to map geographically region), as well as text in the body of the message.

The extracted (and/or normalized) features as well as the classification of the message (e.g., spam or not spam) can be added to a training set of data at 730. At 740, the above (e.g., 710, 720, and 730) can be repeated for substantially all other incoming messages until they are processed accordingly. At 750, features that appear to be useful or the most useful features can be selected from the training set(s). Such selected features can be employed to train a filter, such as a machine learning filter, for example, by way of a machine learning algorithm at 760.

Once trained, a machine learning filter can be utilized to facilitate spam detection as described by an exemplary methodology 800 in FIG. 8. The methodology 800 begins with receiving a message at 810. At 820, one or more features are extracted from the message as described infra with respect to FIG. 11. At 830, the extracted features are passed through a filter trained by a machine learning system, for instance. Following, a verdict such as "spam", "not spam", or a probability of the message being spam is obtained from the machine learning system. Once the verdict is obtained regarding the content of the message, appropriate action can be taken. Types of actions include, but are not limited to, deleting the message, moving the message to a special folder, quarantining the message, and allowing recipient access to the message.

Alternatively, list-based activities can be performed with features extracted from messages. Referring to FIG. 9, there is illustrated a flow diagram of an exemplary process 900 for building and populating lists based at least in part upon extracted features and their occurrence in received messages classified as either spam or not spam (or likely or unlikely to be spam). The process 900 begins by receiving a message at 910. Following, some feature of interest is extracted at 920 such as the message sender's IP address, for example. At some time after the message is received, the message can be classified as spam or not spam, for example, by an existing filter. At 930, the feature can be incrementally counted according to the classification of the message (e.g., spam or not spam). This can be repeated at 940 until substantially all messages are processed (e.g., at 910, 920, and 930). Thereafter at 950, lists of features can be created. For example, one list can be created for sender IP addresses which are 90% good (e.g., not spam 90% of the time or not spam in 90% of incoming messages). Likewise, another list can be created for sender IP addresses which are 90% bad (spam). Other lists for other features can be created in a similar manner.

It should be appreciated that these lists can be dynamic. That is, they can be updated as additional groups of new messages are processed. Hence, it is possible for a sender's IP address to initially be found on a good list; and then at some time later, be found on a bad list, as it is common for some spammers to initially send good mail (e.g., to gain the "trust" of filters as well as recipients) and then begin to send substantially only spam.

These lists can be utilized in various ways. For instance, they can be used to generate training sets for use by a machine learning system to train filters. Such is depicted by an exemplary process 1000 described next in FIG. 10. According to FIG. 10, the process 1000 can begin by receiving a message at 1010. The message can be classified, for instance, as spam or not spam. At 1020, features including but not limited to the sender's IP address can be extracted from the message. At 1030, the extracted features and the classification of the message are added to a training set which is subsequently used to train a machine learning system.

Following at 1040, a special feature corresponding to a particular list the sender IP address is on is included in the training set. For example, if the sender IP address was on the "90% good" list, then the feature added to the training set would be "90% good list". At 1050, the preceding steps (e.g., 1010, 1020, 1030, and 1040) can be repeated to process substantially all incoming messages. Since some features can be more useful for filter training purposes than others, the most useful feature or features are selected based in part on user preferences at 1060 and employed to train a filter(s), such as a spam filter, using a machine learning algorithm.

Moreover, dynamic lists of IP addresses, for example, can be constructed for comparison with test messages, new messages, and/or suspicious messages. However, the IP addresses themselves are not features in this instance. Instead, the quality of the IP address is the feature. Alternatively or in addition, the lists can be utilized in other ways. In practice, for instance, a list of suspicious IP addresses can be used to flag a sender as bad, and accordingly, treat their messages with suspicion.

Figure 11:
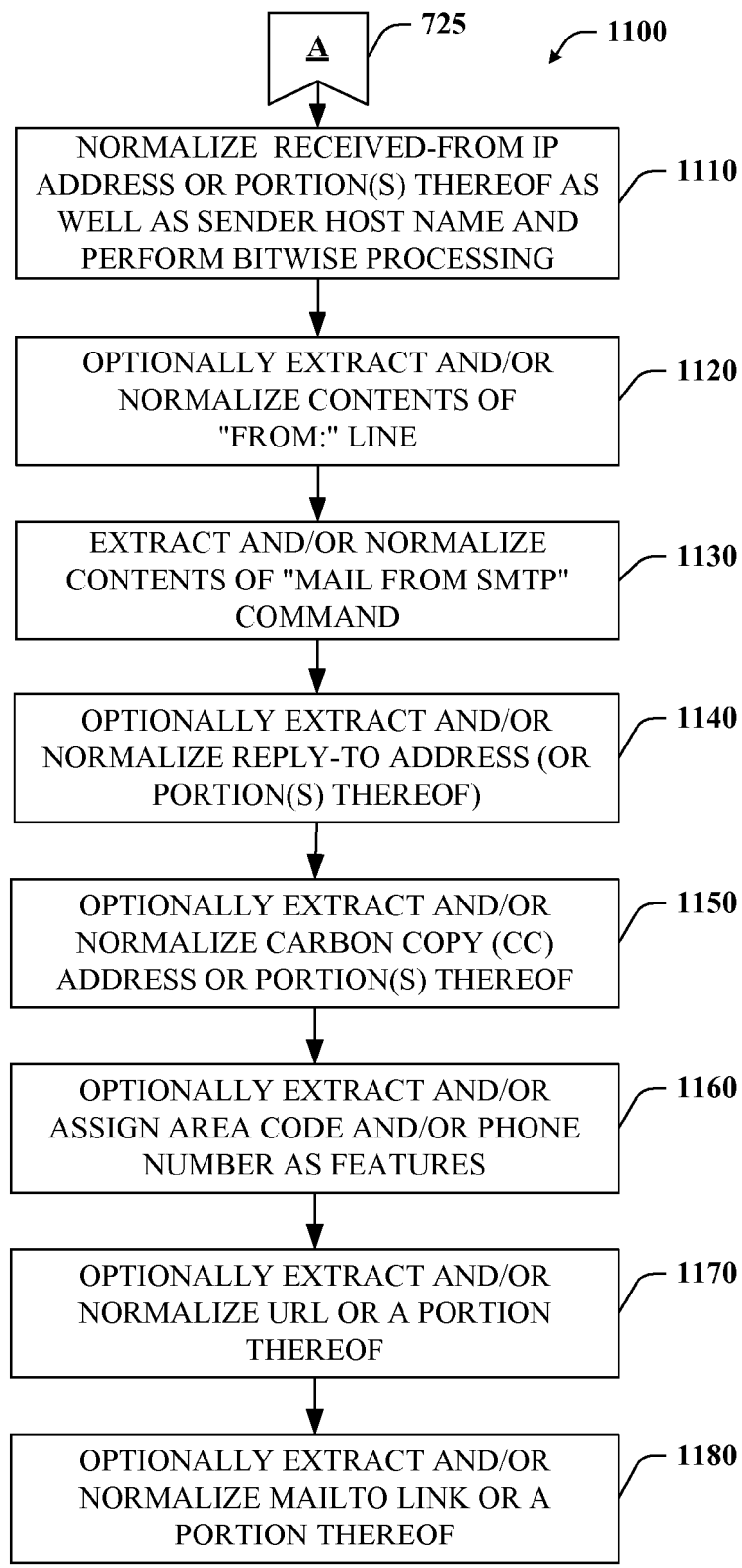
FIG. 11 is a flow diagram of a process referred to in the methods of at least FIGS. 7 and 8 in accordance with an aspect of the present invention.

Turning now to FIG. 11, there is illustrated a flow diagram of an exemplary method 1100 of extracting features from a message in conjunction with the processes 700, 800, 900, and 1000 described above in FIGS. 7-10, respectively. The method 1100 can begin wherein a received-from IP address, or a portion thereof, is extracted and normalized at 1110. Also at 1110, the IP address can undergo bit-wise processing (e.g., first 1 bit, first 2 bits, . . . up to first 31 bits—as discussed in FIG. 3) in order to extract additional features from the received-from IP address. Furthermore, the sender's alleged host name can also be extracted at 1110. The normalized received-from IP address and sender host name features can now be used as features of a machine learning system or related training system.

Optionally, at 1120, contents of the "From:" line can be extracted and/or normalized and subsequently employed as features. At 1130, contents of the "MAIL FROM SMTP" command can similarly be extracted and/or normalized for use as features.

The method 1100 can then proceed to look for other possible features that may be included in the message. For example, it may optionally extract and normalize (if necessary) contents in a reply-to field at 1140. At 1150, contents of the cc field can optionally be extracted and/or normalized for use as at least one feature. At 1160, non-toll free telephone numbers can optionally be extracted from the body of the message and assigned as features as well. Non-telephone numbers can be useful to identify spammers because the area code and/or first three digits of the phone number can be used to map the location of the spammer. If more than one non-toll free telephone number exists in the message, each number can be extracted and used as separate features at 1160.

Likewise, one or more URLs and/or MAILTO links, or portions thereof, can optionally be extracted and/or normalized, respectively at 1170 and 1180. In particular, the URL can undergo pathway stripping (e.g., file name portion of URL), wherein one or more suffixes attached to the end of the FQDN portion of the URL can be stripped away. This can result in one or more partial URLs, depending on the number of suffixes in the pathway. Each partial URL can be employed as a separate feature in accordance with the subject invention.

The method 1100 can continue to scan the body of the message to look for other email addresses as well as key words and/or phrases (e.g., previously selected or determined) which may be more likely to be found in a spam message than in a legitimate message and vice versa. Each word or phrase can be extracted and used as a feature for either the machine learning systems or as an element of a list, or both.

As previously discussed, messages sent over the Internet can be sent from server to server with as few as two servers involved. The number of servers that have contact with the message increases as a result of the presence of firewalls and related network architectures. As the message is passed from server to server, each server prepends its IP address to the received-from field. Each server also has the ability to modify the any earlier prepended received-from addresses. Spammers, unfortunately, can take advantage of this ability and can enter fake addresses in the received-from fields to disguise their location and/or identity and to mislead the recipient as to the source of the message.

Figure 12:
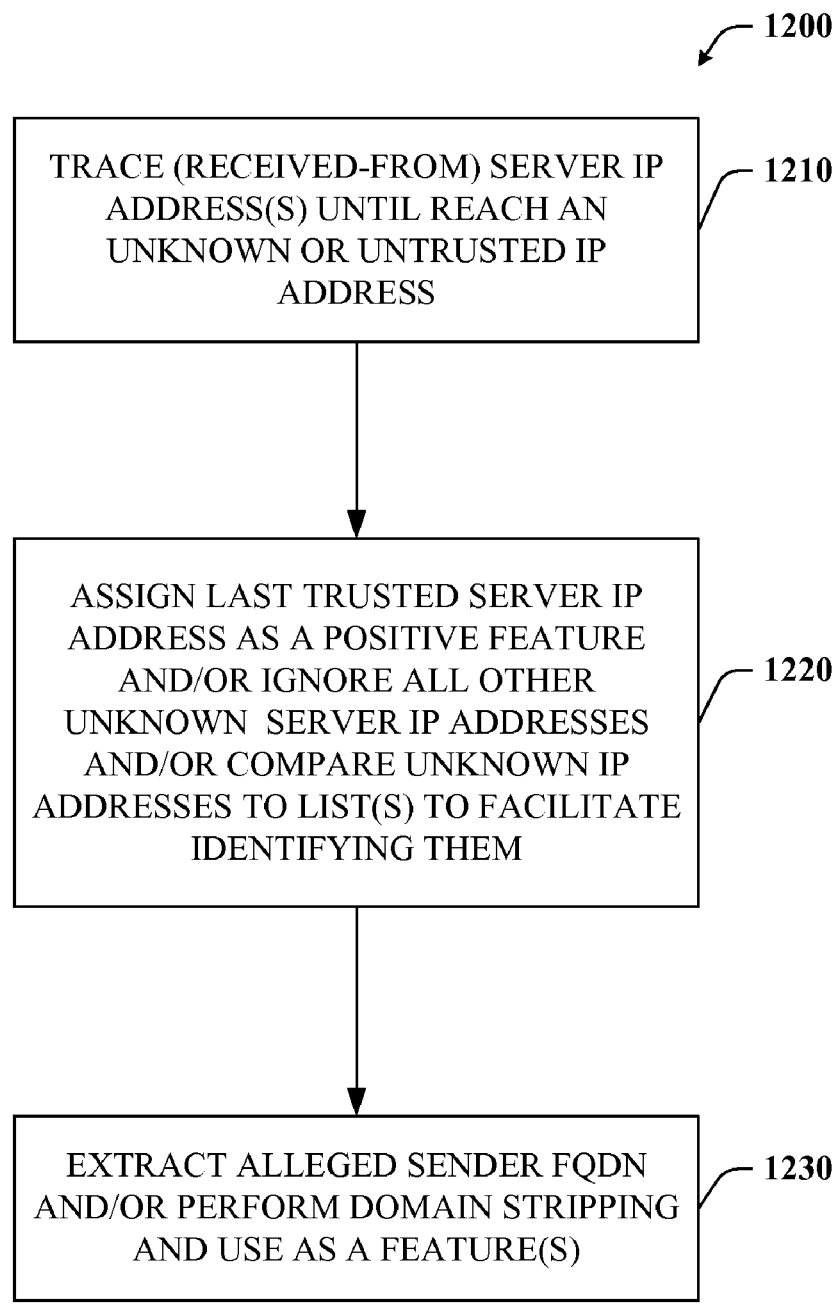
FIG. 12 is a flow diagram of a process that facilitates distinguishing between legitimate and fake received-from IP addresses in accordance with an aspect of the present invention.

FIG. 12 illustrates a flow diagram of an exemplary process 1200 for distinguishing between legitimate and fake (e.g., spammer) prepended server IP addresses in the received-from line of an incoming message. The prepended received-from addresses can be examined in the order in which they were added (e.g., first one is the most recently added). Thus, a user can trace back through the chain of sending server IP addresses to determine a last trusted server IP address at 1210. At 1220, the last trusted server IP address (the one directly outside the organization) can be extracted as a feature to be used by a machine learning system. Any other IP address after the last trusted one can be considered questionable or untrustworthy and may be ignored, but could be compared to lists of (mostly) good IP addresses and (mostly) bad IP addresses.

At 1230, the sender's alleged FQDN can also be extracted to facilitate determining whether the sender is either legitimate or a spammer. More specifically, the alleged FQDN can be broken down by domain stripping to yield more than one partial FQDNs. For instance, imagine that the alleged FQDN is a.b.c.x.com. This alleged FQDN would be stripped in the following manner to yield: b.c.x.com→c.x.com→x.com→com. Thus, each partial FQDN segment as well as the full FQDN can be employed as a separate feature to assist in determining fake and legitimate senders.

The present invention can also make use of parental control systems. Parental control systems can classify a message as unsuitable for viewing based at least in part upon some content of the message and provide a reason for the unsuitable classification. For example, a URL may be embedded within a message as a clickable link (either text or image-based), or as text within the body of the message. The parental control system can compare the embedded URL(s) to one or more of its stored good and/or bad URL lists to determine the proper classification of the message, or using other techniques for parental control classification. The classification can then be used as an additional feature either in the machine learning system or on a feature list, or both.

Figure 13:
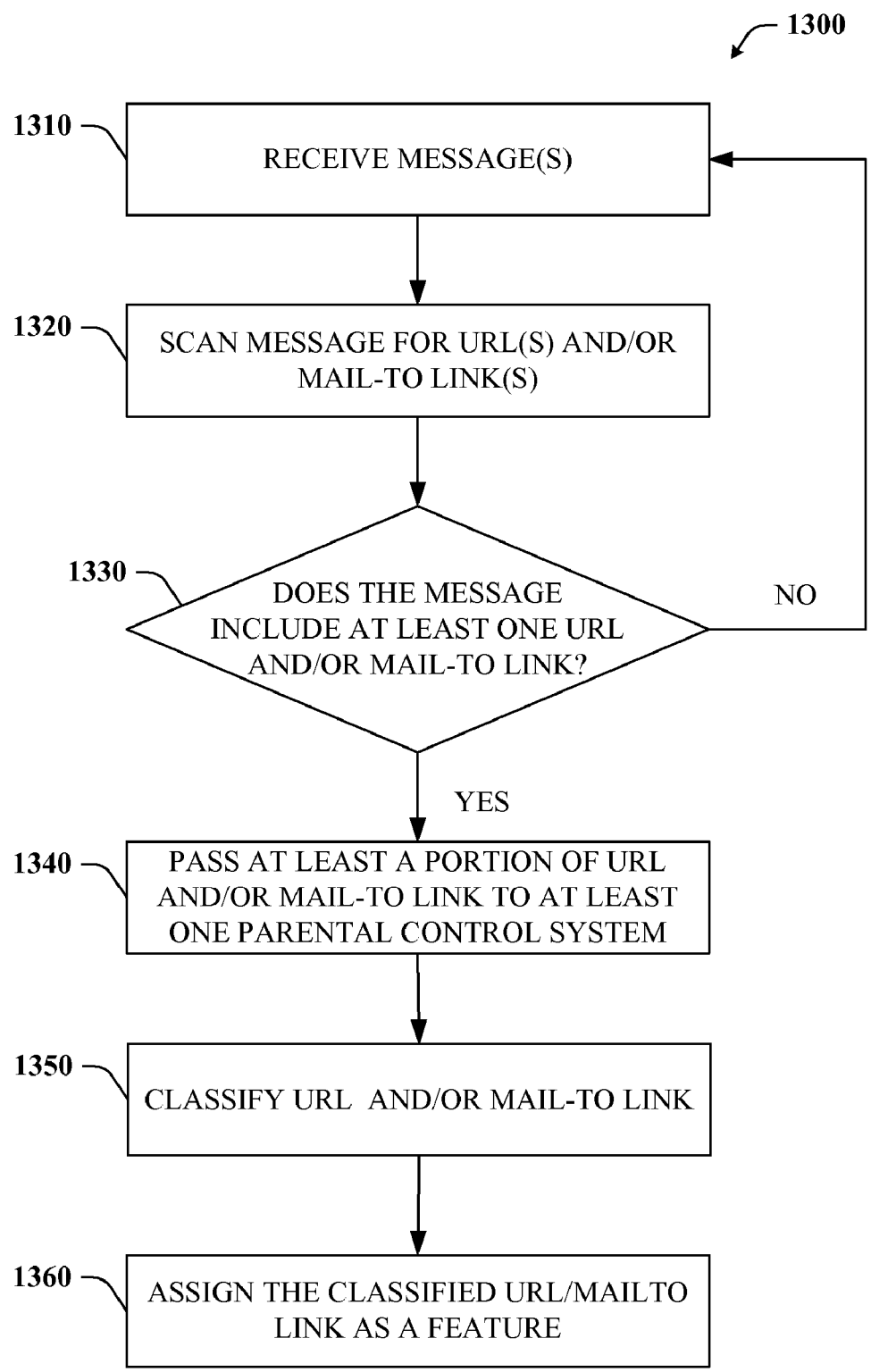
FIG. 13 is a flow diagram of a method that incorporates a parental control system in the generation and/or extraction of features from incoming messages in accordance with an aspect of the present invention.

In FIG. 13, a flow diagram of an exemplary process 1300 for incorporating at least one aspect of a parental control system into the present invention is demonstrated. After receiving a set of messages at 1310, the message can be scanned for URLs, mailto links, or other text which resembles a mailto link, a URL, or some portion of a URL at 1320. If the message does not appear to contain any of the above at 1330, then the process 1300 returns to 1310. However, if the message does indicate such, then at least a portion of the detected characters can be passed on to at least one parental control system at 1340.

At 1350, the parental control system can classify the mailto link, URL, or portion thereof by consulting one or more databases of URLs, mailto links, URL service names, URL paths, and FQDNs (e.g., such as the FQDN portions of URLs, email addresses, etc.). For example, the message may be classified as containing at least one of pornographic, get-out-of-debt, gambling, and other similar material. Such classification can be extracted as an additional feature at 1360. Since the subject matter of a majority of spam messages includes such material, incorporating the parental control system can be useful in obtaining additional features with which the machine learning system can use to train and build improved filters. Other classifications exist as well including, but not limited to, hate speech, sex material, gun-violence, and drug-related material, wherein such classifications can be used as features as well. Spam messages may or may not involve subject matter related to these types of materials, but a user may still want to block these types of messages.

In practice, the different classifications can indicate different degrees of spaminess. For instance, messages classified as hate speech may signify substantially no degree of spaminess (e.g., because it is most likely not spam). Conversely, messages classified as sexual content/material may reflect a relatively higher degree of spaminess (e.g., 90% certainty that message is spam). Machine learning systems can build filters that account for the degree of spaminess. Thus, a filter can be customized and personalized to satisfy user preferences.

As already discussed, a myriad of features can be extracted from a message and used as training data by a machine learning system or as elements on a list(s) identifying good and bad features. The qualities of features, in addition to the features themselves, can be useful in detecting and preventing spam. For instance, imagine that one feature is the sender's email address. The email address could be used as one feature and the frequency or count of that email address appearing in new incoming messages could be used as another feature.

Figure 14:
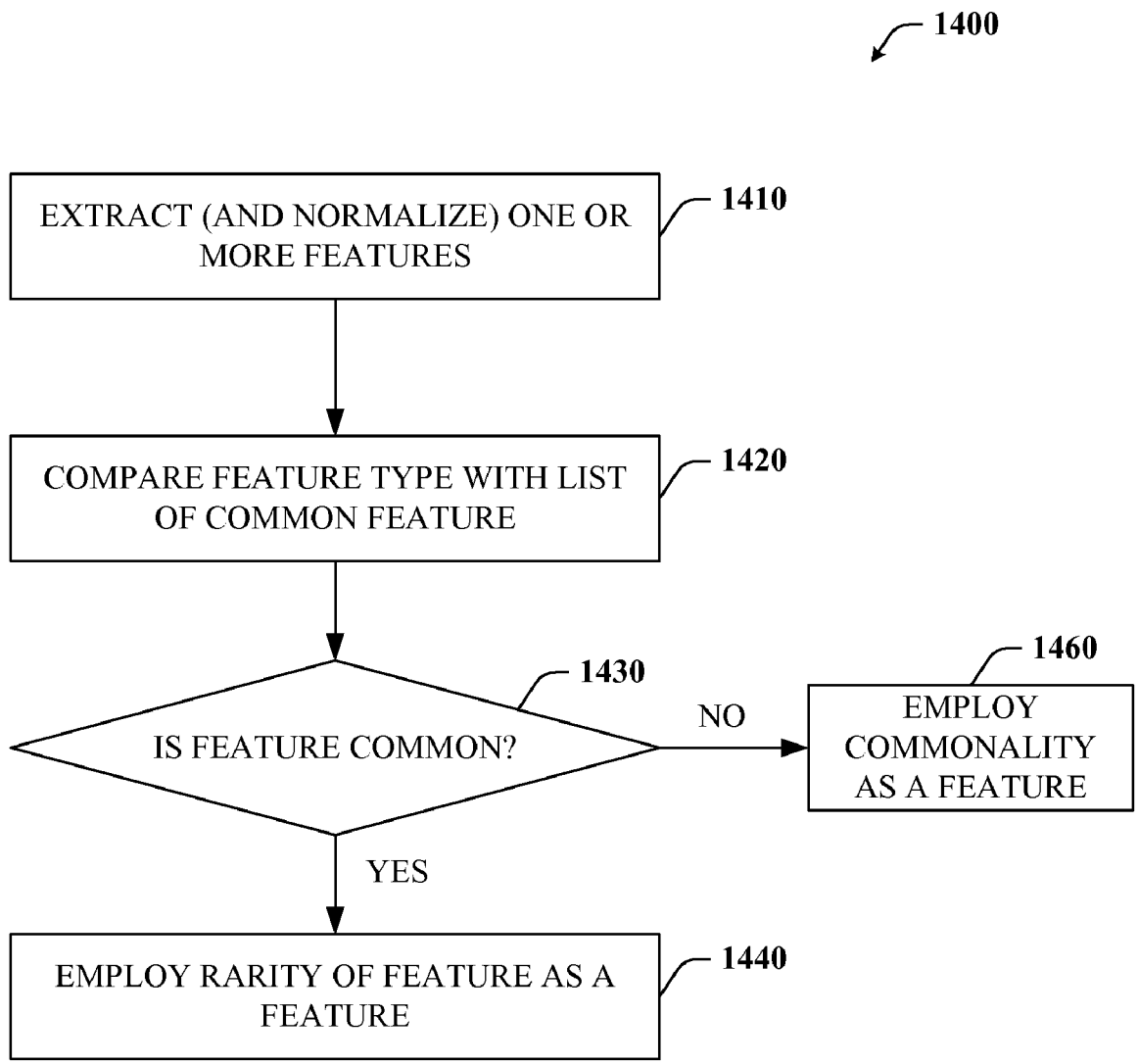
FIG. 14 is a flow diagram of a method that facilitates creation of feature sets to be employed in machine learning system in accordance with an aspect of the present invention.

FIG. 14 depicts a flow diagram of an exemplary process 1400 for extracting this type of feature (e.g., related to the commonality or rarity of the extracted feature). Spammers often try to change their location quickly, and as a result, are more likely than most users to send mail from a previously unseen address or to send mail with URLs pointing to a previously unknown machine, for example. Therefore, for each feature type (e.g., received-from IP address, URL, email address, domain name, etc.) that is extracted, assuming that a list of features for each type is being maintained, a particular feature's occurrence rate, frequency, or count can be tracked.

The process 1400 can begin with an extraction of one or more features from an incoming message and/or normalization of the feature(s) at 1410. The feature can then be compared to one or more lists of features which have been previously extracted or observed in a plurality of previous messages at 1420. The process 1400 can then determine if the present feature is common. The commonality of a feature can be determined by a calculated frequency of the feature appearing in recent and/or previous incoming messages. If the message is not common or not common enough (e.g., fails to satisfy a commonality threshold) at 1430, then its rarity can be used as an additional feature at 1440. Otherwise, the feature's commonality can also be used as a feature as well at 1450.

In accordance with the present invention as described hereinabove, the following pseudo-code can be employed to carry out at least one aspect of the invention. Variable names are indicated in all uppercase. As an additional note, two functions, add-machine-features and add-ip-features are defined at the end of the pseudo-code. Notation like "PREFIX-machine-MACHINE" is used to indicate the string composed of whatever is in the PREFIX variable concatenated with the word "machine" concatenated with whatever is in the MACHINE variable. Finally, the function add-to-feature-list writes the feature to the list of features associated with the current message.

The exemplary pseudo-code is as follows:

```
# for a given message, extract all the features
IPADDRESS := the last external IP address in the
received-from list;
add-ipfeatures(received, IPADDRESS);
```

-continued

```
SENDERS-ALLEGED-FQDN := FQDN in the last external IP
address in the received-from list;
add-machine-features (sendersfqdn, SENDERS-ALLEGED-FQDN);
for each email address type TYPE in (from, CC, to, reply-
to, embedded-mailto-link, embedded-address, and SMTP MAIL
FROM)
{
   for each address ADDRESS of type TYPE in the message
   {
      deobfuscate ADDRESS if necessary;
      add-to-feature-list TYPE-ADDRESS;
      if ADDRESS is of the form NAME@MACHINE then
      {
         add-machine-features(TYPE, MACHINE);
      }
      else
      { # ADDRESS is of form NAME@IPADDRESS
         add-ip-features(TYPE, IPADDRESS);
      }
   }
}
for each url type TYPE in (clickable-links, text-based-
links, embedded-image-links)
{
   for each URL in the message of type TYPE
   {
      deobfuscate URL;
      add-to-feature-list TYPE-URL;
      set PARENTALCLASS := parental control system
class of URL;
      add-to-feature-list TYPE-class-PARENTCLASS;
      while URL has a location suffix
      {
         remove location suffix from URL, i.e.
x.y/a/b/c -> x.y/a/b; x.y/a/b -> x.y/a; x.y/a;
      }
      # All suffixes have been removed; URL is now
either machine name or IP address
      if URL is machine name
      {
         add-machine-features(TYPE, URL);
      }
      else
      {
         add-ip-features(TYPE, URL);
      }
   }
}
function add-machine-features(PREFIX, MACHINE)
{
   add-ip-features(PREFIX-ip, nslookup(MACHINE));
   while MACHINE not equal ""
   {
      add-to-feature-list PREFIX-machine-MACHINE;
      remove beginning from MACHINE # (i.e. a.x.com ->
x.com, or x.com -> com);
   }
}
function add-ip-features(PREFIX, IPADDRESS)
{
   add-to-feature-list PREFIX-ipaddress-IPADDRESS;
   find netblock NETBLOCK of IPADDRESS;
   add-to-feature-list PREFIX-netblock-NETBLOCK;
   for N = 1 to 31 {
      MASKED = first N bits of IPADDRESS;
      add-to-feature-list PREFIX-masked-N-MASKED;
   }
}
```

Figure 15:
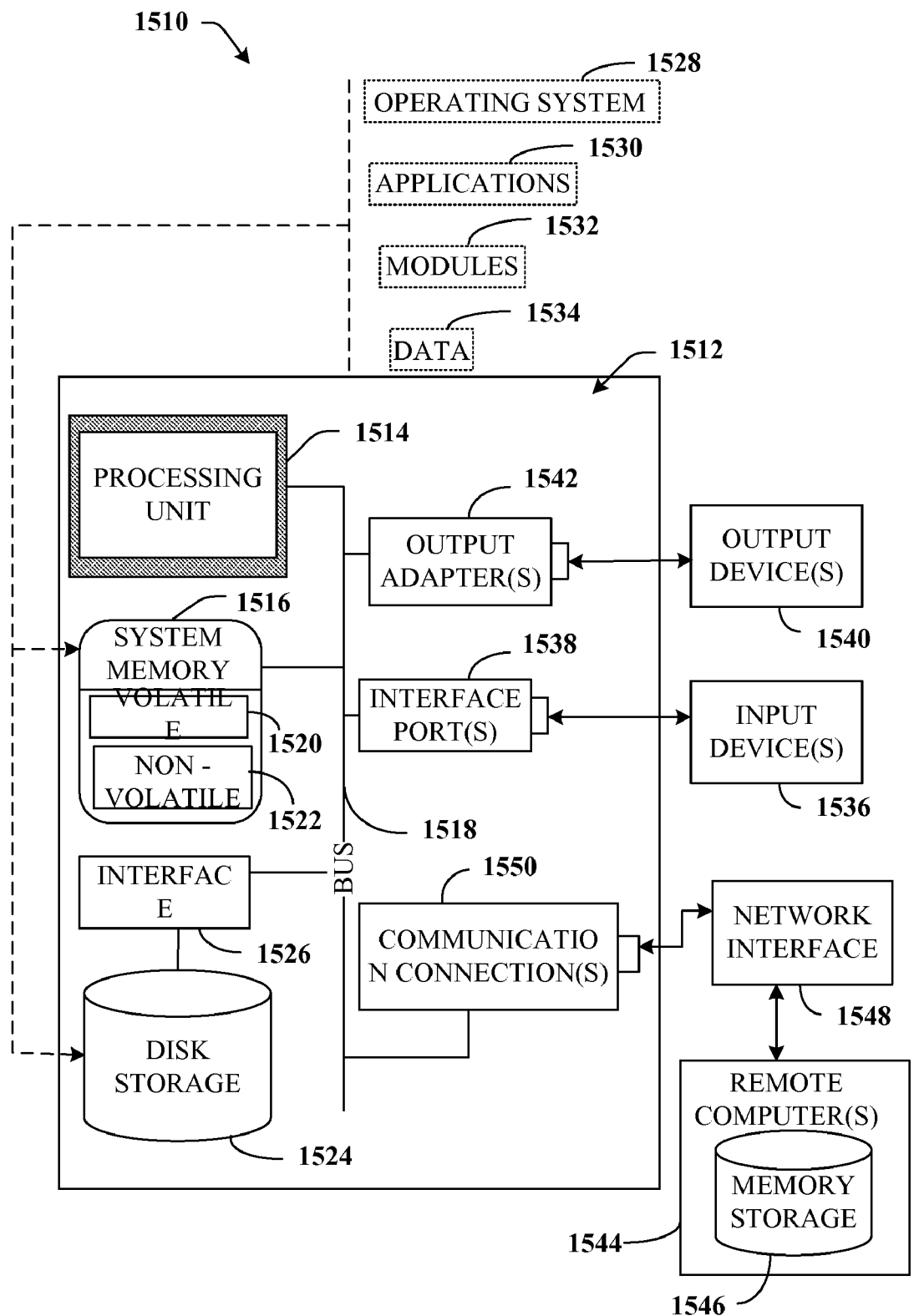
FIG. 15 is an exemplary environment for implementing various aspects of the invention.

In order to provide additional context for various aspects of the present invention, FIG. 15 and the following discussion are intended to provide a brief, general description of a suitable operating environment 1510 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1510 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples the system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/nonremovable, volatile/nonvolatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the present invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates extracting data in connection with spam processing, comprising:
 a memory;
 a processor coupled to the memory;
 a component that receives an item and extracts a set of features associated with an origination of a message or part thereof and/or information that enables an intended recipient to contact, respond or receive in connection with the message, wherein the component that receives the item determines a last trusted server IP address to distinguish between legitimate and fake prepended server IP addresses and the last trusted server IP address is extracted as a feature from the item;
 and a component that employs a subset of the extracted features in connection with building a filter by adding the subset of the extracted features to a training set of data utilized for training and updating the filter, wherein the filter determines a probability that the message is spam when the subset of the extracted features passes through the filter.

2. The system of claim 1, further comprising a normalization component that deobfuscates a subset of the features.

3. The system of claim 1, further comprising a machine learning system component that employs the deobfuscated features to learn at least one of spam and non-spam.

4. The system of claim 1, the subset of features comprising at least one IP address, the at least one IP address being at least a portion of any one of a reply-to address, a carbon copy address, a mail-to address, a received-from address, and a URL located in the message.

5. The system of claim 4, the IP address comprising a block ID, wherein the block ID can be extracted as at least one feature.

6. The system of claim 5, wherein the block ID is determined at least in part by consulting a block directory.

7. The system of claim 5, wherein the block ID is determined at least in part by guessing, thereby extracting as features any one of at least a first 1 bit, at least a first 2 bits, at least a first 3 bits, and up to at least a first 31 bits of the IP address.

8. The system of claim 1, wherein the subset of features comprises each of a first 1 up to a first 31 bits of an IP address.

9. The system of claim 1, the subset of features comprising a URL.

10. The system of claim 1, further comprising a component that employs at least a subset of the extracted features to populate at least one feature list.

11. The system of claim 10, the at least one feature list is any one of a list of good users, a list of spammers, a list of positive features indicating legitimate sender, or a list of features indicating spam.

12. The system of claim 1, the subset of features comprising at least one of a host name or a domain name extracted from an email address.

13. The system of claim 1, the subset of features comprising at least a portion of an FQDN extracted from any one of an email address and a URL.

14. The system of claim 1, the subset of features comprising at least a portion of a domain name extracted from any one of an email address and a URL.

15. A method that facilitates extracting data in connection with spam processing, comprising:

receiving a message; extracting a set of features associated with an origination of the message or part thereof and/or information that enables an intended recipient to contact, respond or receive in connection with the message; wherein a last trusted server IP address is an extracted feature from the message and a determination is made to distinguish between legitimate and fake prepended server IP addresses; and employing a subset of the extracted features in connection with building a filter by adding the subset of the extracted features to a training set of data utilized for training and updating the filter, wherein the filter determines a probability of the message being spam when the subset of the extracted features passes through the filter.

16. The method of claim 15, wherein the set of features comprises website address.

17. The method of claim 16, further comprising extracting additional features from a website address comprises performing at least one of the following acts:

removing at least one suffix at a time thereby yielding respective additional features; and removing at least one prefix at a time, thereby yielding respective additional features.

18. The method of claim 15, further comprising assigning a feature type to the respective extracted features to notify a user of message content based at least in part upon the respective extracted features and using the feature type as an additional feature.

19. The method of claim 18, further comprising determining that at least one of a feature type and a feature are any one of rare and common and using a rarity and a commonality of a feature as an additional feature.

20. A system that facilitates extracting data in connection with spam processing, comprising:

a memory;

a processor coupled to the memory;

a means for receiving a message;

a means for extracting a set of features associated with an origination of the message or part thereof and/or information that enables an intended recipient to contact, respond or receive in connection with the message;

the means for extracting the set of features that determines a last trusted server IP address that distinguishes between legitimate and fake prepended server IP addresses, wherein the last trusted server IP address is extracted as a feature; and a means for employing a subset of the extracted features in connection with building a filter, wherein the filter determines a probability of the message being spam.

* * * * *